United States Patent [19]
Tomisawa et al.

[11] Patent Number: 5,599,254
[45] Date of Patent: Feb. 4, 1997

[54] METHOD AND APPARATUS FOR DIAGNOSING A FAULT IN A LOCK-UP MECHANISM OF A TORQUE CONVERTER FITTED TO AN AUTOMATIC TRANSMISSION

[75] Inventors: Naoki Tomisawa; Keita Yoshizawa, both of Atsugi, Japan

[73] Assignee: Unisia Jecs Corporation, Atsugi, Japan

[21] Appl. No.: 385,710

[22] Filed: Feb. 8, 1995

[30] Foreign Application Priority Data

Feb. 9, 1994 [JP] Japan .................................. 6-015393

[51] Int. Cl.$^6$ ........................ F16D 33/00; B60K 41/02; F16H 61/14
[52] U.S. Cl. ........................ 477/176; 192/3.3; 192/3.31
[58] Field of Search ........................ 192/3.29, 3.3, 192/3.31; 74/731.1; 477/176

[56] References Cited

U.S. PATENT DOCUMENTS

| | | | |
|---|---|---|---|
| 4,700,819 | 10/1987 | Nishikawa et al. | 192/3.31 X |
| 4,724,939 | 2/1988 | Lockhart et al. | 192/3.31 X |
| 4,953,677 | 9/1990 | Aoki et al. | 192/3.31 X |
| 5,121,820 | 6/1992 | Brown et al. | 192/3.29 X |
| 5,160,002 | 11/1992 | Suzuki | 192/3.31 |
| 5,190,128 | 3/1993 | Iizuka | 192/3.31 |
| 5,332,073 | 7/1994 | Iizuka | 192/3.3 |

FOREIGN PATENT DOCUMENTS 2-195072  8/1990  Japan ................................... 192/3.29

*Primary Examiner*—Vinh T. Luong
*Assistant Examiner*—Nathan O. Jensen
*Attorney, Agent, or Firm*—Foley & Lardner

[57] ABSTRACT

A slip condition of a torque converter is learned at a predetermined operating condition with a lock-up mechanism disengaged, and a diagnosis condition (for example a start time or judgement level of the fault diagnosis) used in diagnosing a fault in the lock-up mechanism on the basis of slip conditions of the torque converter which change after issue of a disengage command to the lock-up mechanism, is corrected in accordance with the learned result. As a result, the diagnosis condition which is conventionally set assuming a maximum viscosity for the operating fluid, can be changed to correspond to the actual viscosity of the operating fluid being used. Hence, the time delay from issue of a disengage command to the lock-up mechanism until starting fault diagnosis can be reduced, so that it is possible to diagnose if normal lock-up mechanism disengagement is being made at a response speed which follows the demands for rapid lock-up mechanism disengagement under operating conditions including acceleration and deceleration operating conditions such as encountered with city driving and the like.

24 Claims, 17 Drawing Sheets

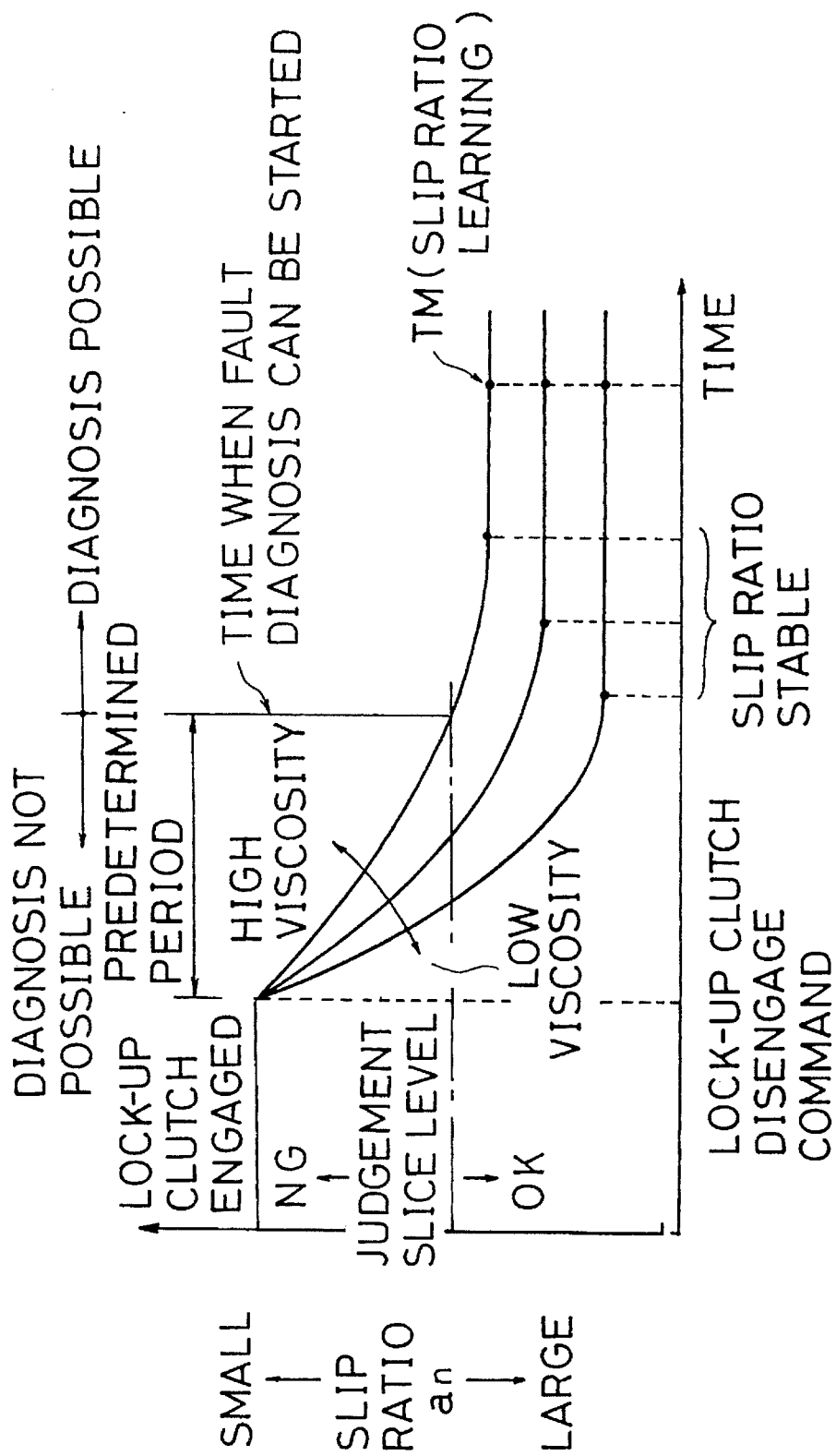

METHOD AND APPARATUS FOR DIAGNOSING A FAULT IN A LOCK-UP MECHANISM OF A TORQUE CONVERTER FITTED TO AN AUTOMATIC TRANSMISSION

FIELD OF THE INVENTION

The present invention relates to a method and apparatus for diagnosing a fault in a lock-up mechanism of a torque converter provided in a vehicle automatic transmission. More particularly the present invention relates to method and apparatus which can diagnose whether or not rapid disengagement of a lock-up mechanism is functioning normally under operating conditions including acceleration and deceleration such as encountered with city driving and the like.

DESCRIPTION OF THE RELATED ART

Heretofore, in general with electronically controlled automatic transmissions connected by way of a torque converter to an internal combustion engine, under predetermined conditions a lock-up clutch is engaged so that the output shaft of the engine (ie., the torque converter input shaft) and the input shaft of the automatic transmission (ie., the torque converter output shaft) are integrally connected. As a result the difference in rotational speed between the engine and the automatic transmission becomes zero, so that the engine output is effectively transferred to the automatic transmission, thereby improving fuel consumption and exhaust composition.

However, if an abnormality occurs in the lock-up clutch itself, or in a lock-up solenoid valve which supplies and shuts off hydraulic pressure supplied from a hydraulic mechanism to engage or disengage the lock-up clutch, and control system etc. (also referred to hereunder as the lock-up mechanism), so that the lock-up clutch cannot be engaged as required in spite of operating under predetermined conditions for engagement, then a rotational speed difference will occur between the engine and the automatic transmission, so that the engine output cannot be effectively transferred to the automatic transmission. As a result more engine output than normal is required, causing a deterioration in fuel consumption and exhaust composition, and a drop in acceleration performance.

Alternatively, if the engagement of the lock-up clutch cannot be released, then various types of problems arise such as an increase in speed change shook, engine stall, and difficulty in starting, causing a loss in vehicle drivability. Moreover, since the rotational speed of the engine will drop more than necessary with influence from the drive system, then with subsequent acceleration, the acceleration required to match the demand of the driver will be lacking by a recovery amount for the engine rotational speed. Accelerator operation must therefore be increased to compensate for this amount, causing a deterioration in fuel consumption and exhaust composition.

Such unfavourable conditions can be detected based for example on the ratio of the rotational speeds of the input and output shafts of the torque converter at the time of engagement and disengagement of the lock-up clutch (for example, on the slip ratio=N2/N1, where N1 is the input shaft rotational speed (ie., the engine rotational speed) and N2 is the output shaft rotational speed), or on the ratio of the input shaft rotational speed N1 and the vehicle speed VSP (for example, on the slip ratio=VSP/(k×N1), where k is a constant based for example on the final speed reduction ratio and the tire diameter). That is, unfavourable conditions of the lock-up mechanism can be diagnosed to occur when, in spite of an engage command, the slip ratio is large, or in spite of a disengage command, the ratio of the input and output shaft rotational speeds or the slip ratio is small.

With regards to diagnosing whether or not the lock-up clutch has been disengaged, then as shown in FIG. 17, since the viscosity of the operating fluid inside the torque converter differs for example, due to deterioration with time, difference in temperature conditions, or due to different properties of the operating fluid itself, the time until the slip ratio becomes stable will differ due to the difference in the viscosity. Therefore, it has heretofore been necessary to delay the start period for the diagnosis until a predetermined time has elapsed from issue of the disengage command to the lock-up clutch. With normal operation of the lock-up mechanism, this delay is made comparatively long to ensure that the slip ratio (judgement slice level) is definitely above a predetermined value irrespective of changes in the viscosity of the operating fluid.

Consequently, with the conventional arrangement, since the start time for fault diagnosis related to lock-up clutch disengagement is delayed, then even if rapid lock-up clutch disengagement is not being carried out as required under operating conditions including acceleration and deceleration such as encountered with city driving and the like, due for example to a drop in reduction rate of the hydraulic pressure supplied to the lock-up clutch, or a drop in the opening or closing speed of the lock-up solenoid valve, this cannot be detected. That is to say, the situation is such that deterioration in fuel consumption, exhaust composition, and drivability etc. caused by the abnormality of rapid disengagement of the lock-up clutch cannot be addressed.

SUMMARY OF THE INVENTION

The present invention takes into consideration the above situation with the conventional arrangement, with the object of providing a fault diagnosis method and apparatus for a lock-up mechanism, which can diagnose to a high accuracy whether or not rapid lock-up mechanism disengagement is being carried out as required under operating conditions including acceleration and deceleration, so as to keep to a minimum the undesirable conditions such as a deterioration in fuel consumption, exhaust composition, and vehicle drivability which occur with city driving and the like. It is a further object of the present invention to achieve this with a simple construction and improved diagnosis accuracy.

In view of the above objects, the method and apparatus according to the present invention for diagnosing a fault in a lock-up mechanism of a torque converter fitted to an automatic transmission, involves; an input shaft rotational speed detecting step and device A for detecting a rotational speed of an input shaft of the torque converter, an output shaft rotational speed detecting step and device B for detecting a rotational speed of an output shaft of the torque converter, a slip condition detecting step and device C for detecting a slip condition of the torque converter based on the torque converter input shaft rotational speed and output shaft rotational speed, a fault diagnosis step and device D for diagnosing a fault in the lock-up mechanism on the basis of a slip condition of the torque converter during change after issue of a disengage command to the lock-up mechanism, detected by the slip condition detecting step and device C, a slip condition learning step and device E for learning a slip condition of the torque converter at a predetermined operating condition with the lock-up mechanism disengaged, and a diagnosis condition correction step and device F for correcting a diagnosis condition of the fault diagnosis step and device D in accordance with the learned result of the slip condition.

With such a construction, a slip condition of the torque converter is learned at a predetermined operating condition with the lock-up mechanism disengaged, and a diagnosis condition used in diagnosing a fault in the lock-up mechanism on the basis of slip conditions of the torque converter which change after issue of the disengage command to the lock-up mechanism, is corrected in accordance with the learned result (that is, with consideration of the viscosity of the operating fluid in the torque converter). Therefore, with the present invention, the diagnosis condition which was conventionally set assuming a maximum viscosity for the operating fluid, can be set and changed to correspond to the actual viscosity of the operating fluid being used. Hence, the time delay from issue of a disengage command to the lock-up mechanism until starting fault diagnosis can be reduced, so that it is possible to diagnose if normal lock-up mechanism disengagement is being made at a response speed which follows the demands for rapid lock-up mechanism disengagement under operating conditions including acceleration and deceleration operating conditions such as encountered with city driving and the like. Accordingly, poor response characteristics of the lock-up mechanism can be detected, so that this can be brought to the attention of the driver for appropriate action. The deterioration in fuel consumption, exhaust composition, and drivability and the like, attributable to poor lock-up mechanism response characteristics under operating conditions such as city driving can thus be significantly reduced.

When the construction is such that the fault diagnosis step and device D diagnoses a fault in the lock-up mechanism by comparing a slip condition of the torque converter after lapse of a predetermined time from issue of a disengage command to the lock-up mechanism, with a previously determined judgement value, then the predetermined time as the diagnosis condition may be corrected by the diagnosis condition correction step and device F. More specifically, a slip condition of the torque converter is learned at a predetermined operating condition with the lock-up mechanism disengaged, and the predetermined time from issue of the disengage command to the lock-up mechanism until start of the fault diagnosis, that it to say the diagnosis start time is corrected in accordance with the learned result (for example, in accordance with a change in viscosity of the operating fluid in the torque converter) (refer to FIG. 6). Hence, the start time of the fault diagnosis which is set at a greatly delayed setting in consideration of the maximum viscosity, can be set and changed by means of a simple construction so as to correspond to the actual viscosity of the operating fluid being used. The diagnosis start time can thus be advanced corresponding to the viscosity of the operating fluid, so that it is possible to diagnose if normal lock-up mechanism disengagement is being made at a response speed which follows the demands for rapid lock-up mechanism disengagement such as encountered with city driving and the like. Accordingly, poor response characteristics of the lock-up mechanism occurring in such driving conditions can be detected, so that this can be brought to the attention of the driver for appropriate action. The deterioration in fuel consumption, exhaust composition, and drivability and the like, under operating conditions such as city driving can thus be significantly reduced.

Moreover, when the construction is such that the fault diagnosis step and device D diagnoses a fault in the lock-up mechanism by comparing a slip condition of the torque converter after lapse of a predetermined time from issue of a disengage command to the lock-up mechanism, with a previously determined judgement value, then the previously determined judgement value as the diagnosis condition may be corrected by the diagnosis condition correction step and device F. More specifically, a slip condition of the torque converter is learned, and the judgement value for judging fault diagnosis by comparison with actual slip conditions is corrected in accordance with the learned result (for example, in accordance with a change in viscosity of the operating fluid in the torque converter) (refer to FIG. 8). If the judgement value is changed in this way in accordance with the learned result, then as with the previous construction, diagnosis of faults in the lock-up mechanism can be made with good response characteristics, corresponding to the actual viscosity of the operating fluid being used. Accordingly it is possible to diagnose if normal lock-up mechanism disengagement is being made at a response speed which follows the demands for rapid lock-up mechanism disengagement such as encountered with city driving and the like. The deterioration in fuel consumption, exhaust composition, and drivability and the like, under operating conditions such as city driving can thus be significantly reduced.

When the construction is such that the fault diagnosis step and device D diagnoses a fault in the lock-up mechanism by comparing a slip condition of the torque converter after lapse of a predetermined time from issue of a disengage command to the lock-up mechanism, with a previously determined judgement value, then both the predetermined time and the judgement value as the diagnosis conditions may be corrected by the diagnosis condition correction step and device F. More specially, a slip condition of the torque converter is learned, and the predetermined time from issue of the disengage command to the lock-up mechanism until of the fault diagnosis, and the judgement value for judging fault diagnosis by comparison with actual slip conditions are both corrected in accordance with the learned result (refer to FIG. 5). As a result, it is possible to diagnose, while maintaining high judgement accuracy, if normal lock-up mechanism disengagement is being made at a response speed which follows the demands for rapid lock-up mechanism disengagement such as encountered with city driving and the like.

When the construction is such that the fault diagnosis step and device D diagnoses a fault in the lock-up mechanism by comparing a required time from issue of a disengage command to the lock-up mechanism until a slip condition of the torque converter reaches a previously determined judgement value, with a previously determined judgement time, then the judgement time as the diagnosis condition may be corrected by the diagnosis condition correction step and device F. More specifically, a slip condition of the torque converter is learned, and the judgement time for comparison with the required time from issue of the disengage command to the lock-up mechanism until the slip condition reaches the previously determined judgement value, is corrected in accordance with the learned result (refer to FIG. 10). Hence, the start time of the fault diagnosis which is set at a greatly delayed setting in consideration of the maximum viscosity, can be set and changed so as to correspond to the actual viscosity of the operating fluid being used. As a result, it is possible to diagnose if normal lock-up mechanism disengagement is being made at a response speed which follows the demands for rapid lock-up mechanism disengagement such as encountered with city driving and the like. Accordingly, the time delay from issue of a disengage command to the lock-up mechanism until starting fault diagnosis can be reduced corresponding to the actual viscosity of the operating fluid being used. The deterioration in fuel consumption, exhaust composition, and drivability and the like, occurring under operating conditions such as city driving can thus be significantly reduced.

Moreover, when the construction is such that the fault diagnosis step and device D diagnoses a fault in the lock-up mechanism by comparing a required time from issue of a disengage command to the lock-up mechanism until a slip condition of the torque converter reaches a previously determined judgement value, with a previously determined judgement time, then the judgement value as the diagnosis condition may be corrected by the diagnosis condition correction step and device F. More specifically, a slip condition of the torque converter is learned at a predetermined operating condition with the lock-up mechanism disengaged, and the judgement value is corrected in accordance with the learned result, that is to say, in accordance with a change in viscosity of the operating fluid in the torque converter (refer to FIG. 12). If the judgement value is changed in this way in accordance with the learned result, then even with an advanced fault diagnosis start time, faults in the lock-up mechanism can still be adequately diagnosed. Therefore, the fault diagnosis start time is advanced so that it is possible to diagnose if normal lock-up mechanism disengagement is being made at a response speed which follows the demands for rapid lock-up mechanism disengagement such as encountered with city driving and the like. The deterioration in fuel consumption, exhaust composition, and drivability and the like, under operating conditions such as city driving can thus be significantly reduced.

Furthermore, when the construction is such that the fault diagnosis step and device D diagnoses a fault in the lock-up mechanism by comparing a required time from issue of a disengage command to the lock-up mechanism until a slip condition of the torque converter reaches a previously determined judgement value, with a previously determined judgement time, then both the judgement time and the judgement value as the diagnosis conditions may be corrected by the diagnosis condition correction step and device F. More specifically, when such an arrangement as mentioned above is provided for the fault diagnosis step and device, a slip condition of the torque converter is learned at a predetermined operating condition with the lock-up mechanism disengaged, and the judgement time and the judgement value are both corrected in accordance with the learned result (refer to FIG. 14). As a result, it is possible to diagnose, while maintaining high judgement accuracy, if normal lock-up mechanism disengagement is being made at a response speed which follows the demands for rapid lock-up mechanism disengagement such as encountered with city driving and the like.

Additionally, when the construction is such that the fault diagnosis step and device D diagnoses a fault in the lock-up mechanism by comparing a change factor for the slip conditions of the torque converter which change after issue of the disengage command to the lock-up mechanism, with a previously determined judgement value, then the judgement value as the diagnosis condition may be corrected by the diagnosis condition correction step and device F. More specifically, a slip condition of the torque converter is learned, and the judgement value is corrected in accordance with the learned result (refer to FIG. 15). With such a construction, since a slip condition change factor is detected, then fault diagnosis can be carried out in a very short time after issue of the disengage command. Consequently, it is possible to diagnose, if normal lock-up mechanism disengagement is being made at high response speeds which follow the demands for very rapid lock-up mechanism disengagement in city driving and the like. The deterioration in fuel consumption, exhaust composition, and drivability and the like, under operating conditions such as city driving can thus be kept to a minimum.

Regarding the slip condition learning step and device E, preferably this involves learning a slip condition of the torque converter at a predetermined operating condition after lapse of a predetermined time from issue of a disengage command to the lock-up mechanism. That is to say, it is preferable to simply detect the disengage condition of the lock-up mechanism with a simple construction using the elapsed time from issue of a disengage command to the lock-up mechanism.

Other objects and aspects of the present invention will become apparent from the following description of embodiments of the invention given in conjunction with the appended drawings.

BRIEF DESCRIPTION OF THE DRAWINGS

FIG. 17 is a time chart for explaining problems with conventional methods and apparatus, showing the change of a slip ratio with change in viscosity of an operating fluid.

DETAILED DESCRIPTION OF THE PREFERRED EMBODIMENTS

Embodiments of fault diagnosis methods and apparatus according to the present invention for diagnosing a fault in a lock-up mechanism of a torque converter fitted to an automatic transmission are shown in FIG. 2 through FIG. 16.

Figure 1:
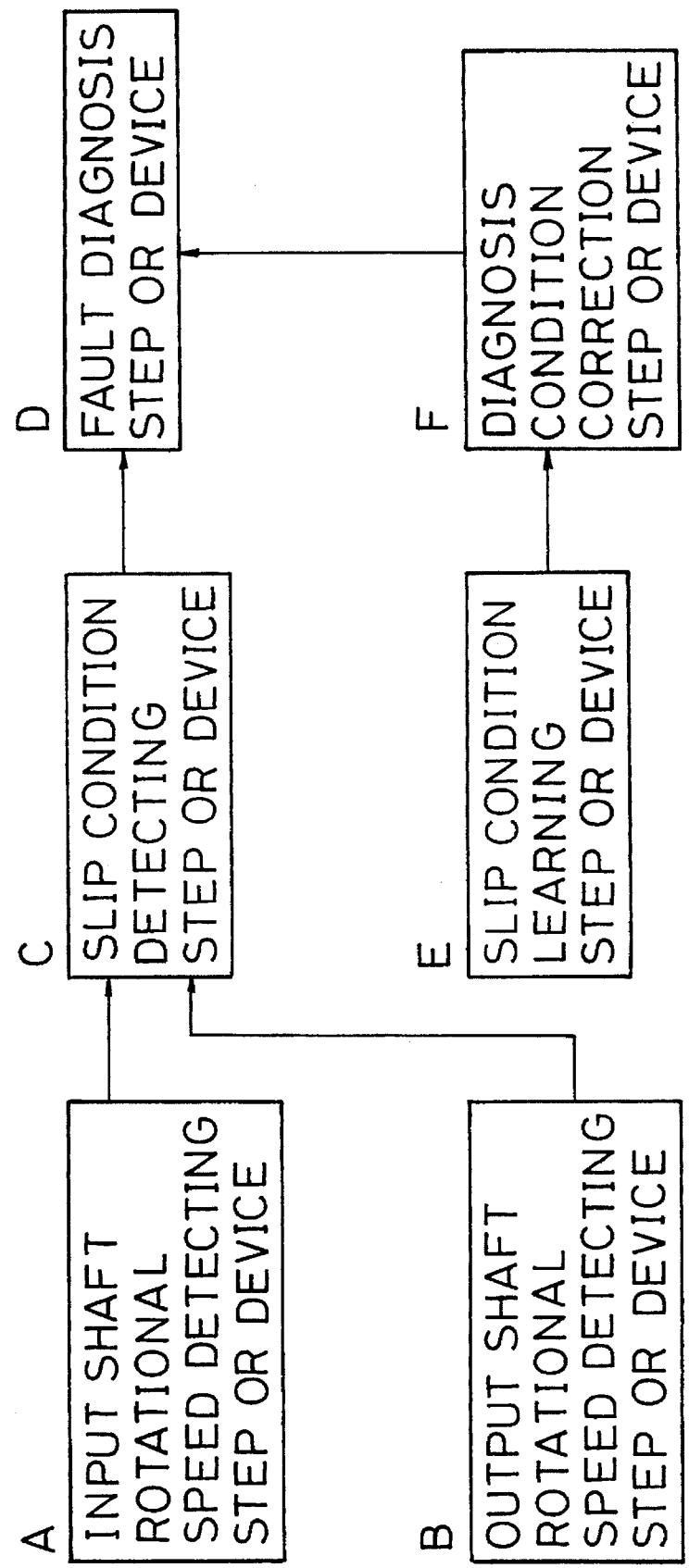
FIG. 1 is a block diagram of the present invention.
Figure 2:
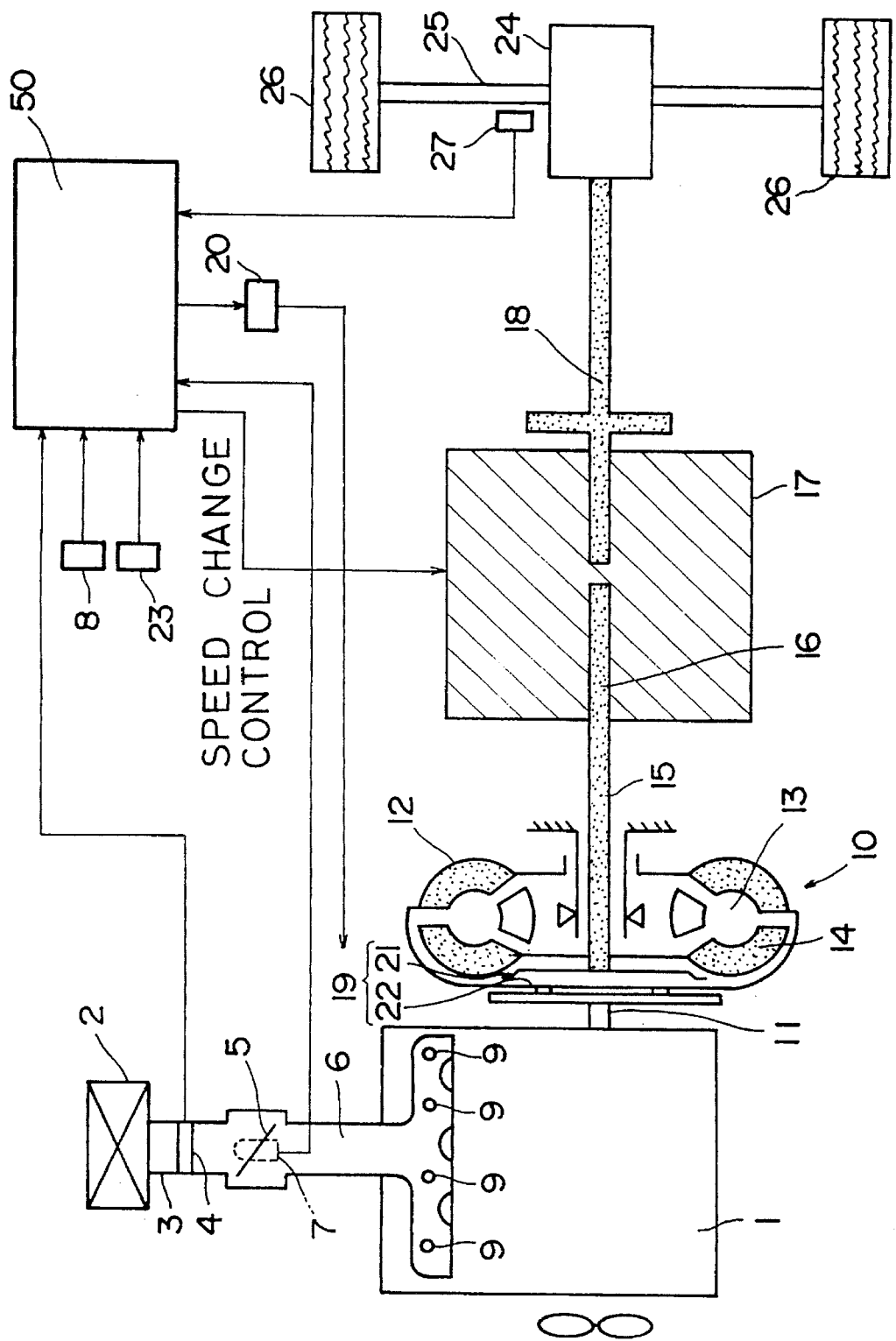
FIG. 2 is a schematic diagram showing the overall construction of embodiments of the present invention.

As shown in FIG. 2, an engine 1 draws in air from an air cleaner 2 by way of an intake duct 3, an air flow meter 4 for detecting an intake air quantity Q, a throttle valve 5 operated by an accelerator pedal (not shown in the figure), and an intake manifold 6. The throttle valve 5 is provided with a throttle sensor 7 for detecting a throttle valve opening (TVO) thereof. An output signal from the throttle sensor 7 corresponding to the throttle valve opening TVO is input to a control unit 50. Also provided on the throttle valve 5 is an idle switch 8 for generating an ON signal (which is also input to the control unit 50) when the throttle valve 5 is fully closed.

Fuel injection valves 9 are provided for each cylinder in respective branch portions of the intake manifold 6. The fuel injection valves 9 are electromagnetic type fuel injection valves which open with power to a solenoid and close with power shut-off. The fuel injection valves 9 are driven open in response to a drive pulse signal from the control unit 50 (to be described later) so that fuel pressurized by a fuel pump, and controlled to a predetermined pressure by means of a pressure regulator, is injected into the engine 1. Ignition plugs (not shown in the figure) are provided for each combustion chamber of the engine 1, for igniting a mixture therein based on an ignition signal from the control unit 50.

An output shaft of the engine 1 is integrally connected to an input shaft 11 of a torque converter generally indicated by arrow 10, so as to rotatingly drive a pump impeller 12 which is also integrally connected to the input shaft 11. The motive force of the engine 1 is transferred to an output shaft 15 of the torque converter 10 through the medium of an operating fluid 13 contained in the torque converter 10, by rotational drive of a turbine runner 14 which is integrally connected to the output shaft 15. The motive force transferred to the output shaft 15 is input to an automatic transmission 17 by way of an input shaft 16 connected to the output shaft 15.

The motive force input in this way to the automatic transmission 17, is first changed by the mechanism inside the automatic transmission 17 to a predetermined speed based on a signal from the control unit 50, and is then output from an output shaft 18. The motive force output from the output shaft 18 is transferred to drive wheels 26 by way of, for example, a propeller shaft (not shown in the figure), a differential gear 24 and an axle shaft 25.

The torque converter 10 is provided with a lock-up clutch 19 which mechanically connects the input shaft 11 to the output shaft 15. Hydraulic pressure is supplied to or shut off from the lock-up clutch 19 by an opening or closing operation of a lock-up solenoid 20 disposed in a hydraulic mechanism (not shown in the figure). As a result, a lock-up piston 21 is moved either towards the left in FIG. 2 to press against a friction plate 22 provided integrally with the input shaft 11 and engage therewith, or towards the right in FIG. 2 to separate from the friction plate 22.

While the above construction is such that the lock-up solenoid 20 opens a valve to engage the lock-up clutch 19, and closes the valve to separate the lock-up clutch 19, it is also possible for the alternative arrangement wherein the lock-up solenoid 20 opens the valve to separate the lock-up clutch 19, and closes the valve to engage the lock-up clutch 19. The lock-up solenoid 20 performs the opening and closing operation under predetermined conditions based on a drive signal generated from the control unit 50. The lock-up clutch 19, lock-up solenoid 20, hydraulic mechanism, and control unit 50 etc. constitute the lock-up mechanism of the present invention. While the present embodiment has been described for a friction type lock-up mechanism, it is of course possible to use an electromagnetic type lock-up mechanism.

A crank angle sensor 23 is incorporated into a distributor (not shown) of the engine 1. To determined the engine rotational speed N1, the control unit 50 either counts over a fixed period unit crank angle signals output from the crank angle sensor 23 in synchronous with the engine rotation, or measures the period of a reference crank angle signal. The rotational speed N1 of the engine 1 can also be directly detected from the rotational speed of the input shaft 11 of the torque converter 10. The crank angle sensor 23 constitutes the torque converter input shaft rotational speed detecting device of the present invention.

A vehicle speed sensor 27 which detects rotational speed of the axle shaft 25, and detects vehicle speed (VSP) based on the speed change step of the automatic transmission 17 is also provided. The vehicle speed sensor 27 constitutes the torque converter output shaft rotational speed detecting device of the present invention. The rotational speed of the axle shaft 25 may be detected for example using a gear mechanism.

The control unit 50 incorporates a microcomputer having for example, a CPU, ROM, RAM, A/D converter and input/output interface. This receives input signals from the various sensors, and controls the fuel injection amount of the fuel injection valves 9 as described in outline below.

More specifically, the control unit 50 computes the basic fuel injection quantity (engine load) Tp from the intake air quantity Q detected by the air flow meter 4, and the engine rotational speed N1 obtained by counting the pulse signals from the crank angle sensor 23 over a fixed period (Tp=c× Q/N1, where c is a constant), and outputs, as a drive pulse signal to the fuel injection valves 9, a final fuel injection quantity Te obtained by correcting the basic fuel injection quantity Tp with various correction coefficients (for example an air-fuel ratio feedback correction coefficient, a water temperature correction coefficient, a learning correction coefficient, and a load correction coefficient).

The control unit 50 also receives signals from the throttle sensor 7 and the like, and the vehicle speed sensor 27, and looks up a speed change control map based for example on previously stored throttle valve openings TVO (or engine loads Tp), and the vehicle speed (VSP), to effect control of the automatic transmission.

Figure 3:
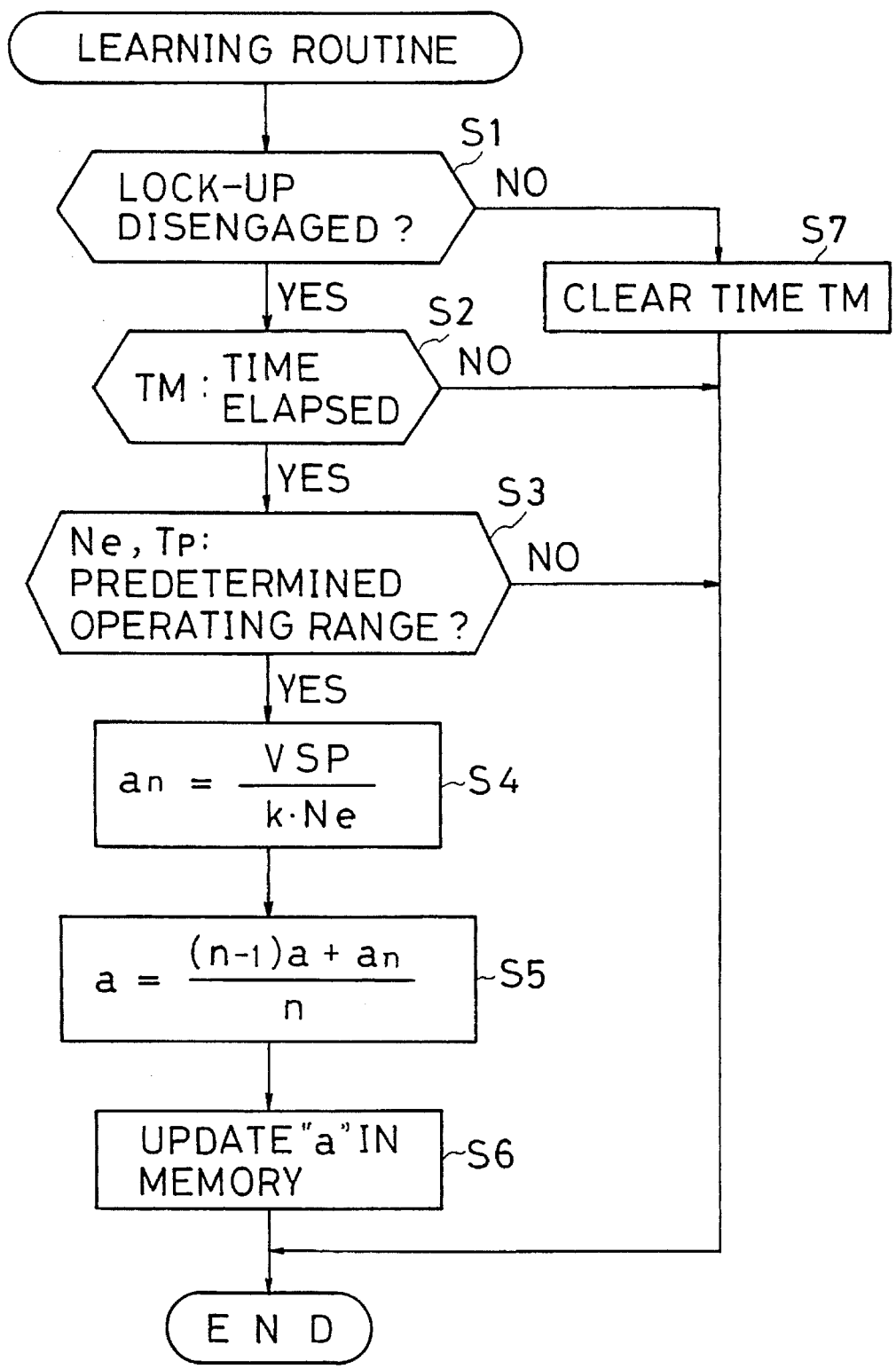
FIG. 3 is a flow chart for explaining a slip ratio learning routine in the present embodiments.

Referring now to the flow chart of FIG. 3, a slip condition learning routine carried out in the control unit 50, and required for diagnosing whether or not the lock-up mechanism is operating with the required response speed, will now be explained. The slip condition learning routine detects for example viscosity changes accompanying deterioration with age of the operating fluid 13, viscosity change with temperature, or viscosity change at the time of changing to an operating fluid 13 of different properties (viscosity index and the like). The slip condition learning routine constitutes the slip condition learning device of the present invention.

In step 1 (with step indicated by S in the figures) it is judged if a disengage signal for the lock-up clutch 19 (that is, a disengage command to the lock-up mechanism) is being sent to the lock,up solenoid 20. If so (YES), control proceeds to step 2, while if not (NO), control proceeds to step 7 where an elapsed time TM from issue of the disengage signal is cleared, and the learning routine is then terminated.

Figure 5:
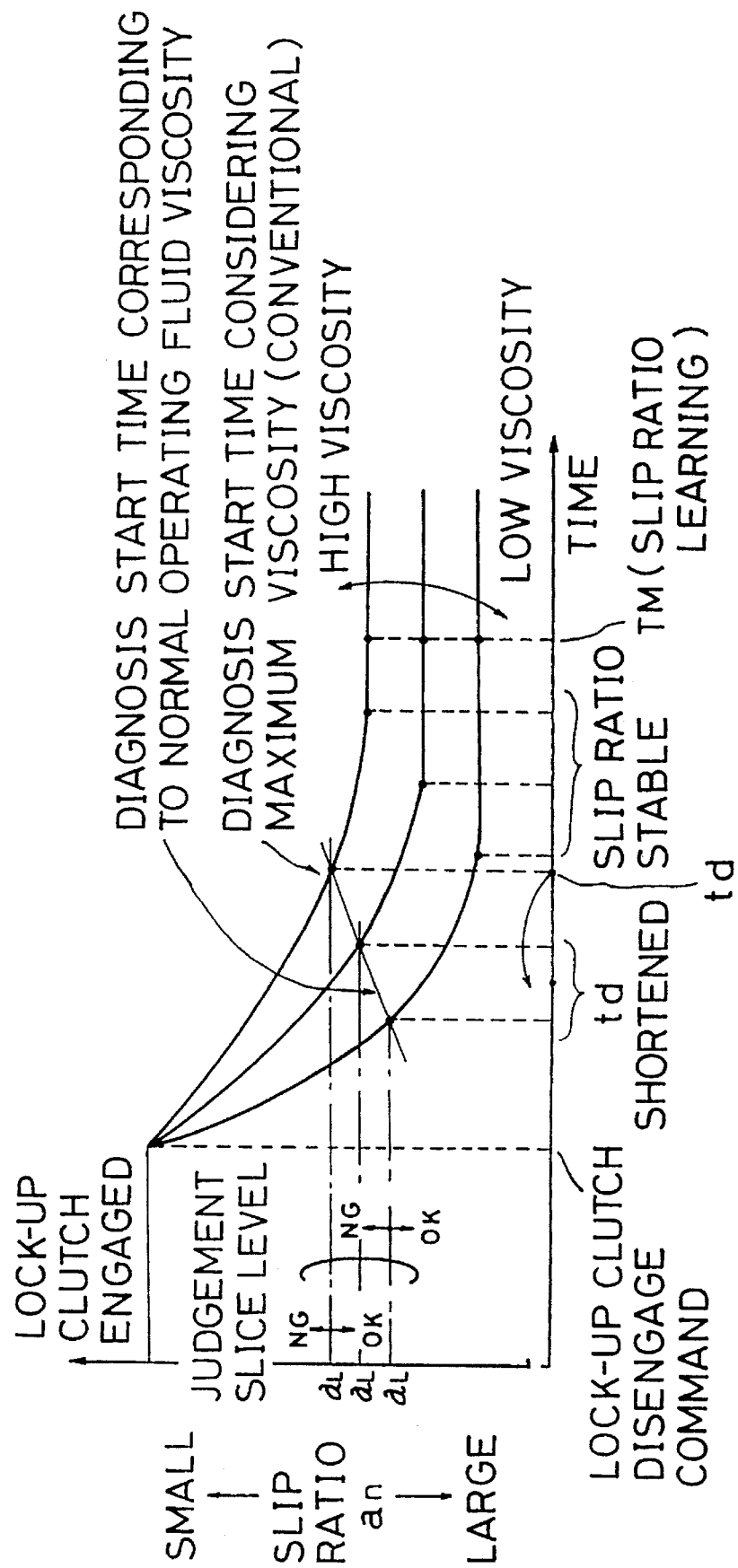
FIG. 5 is a time chart for explaining operations in the first embodiment.

In step 2, it is judged if the elapsed time from issue of the disengage signal has attained the predetermined time TM shown in FIG. 5, sufficient for the slip ratio $a_n$ (to be described later) to be completely stable in spite of viscosity changes of the operating fluid 13. If so, the control proceeds to step 3, while if not, the routine is repeated until the elapsed time from issue of the disengage signal becomes the predetermined time TM. The predetermined time TM assuming the operating fluid 13 to be one of maximum viscosity, can be a predetermined time for the slip ratio to become stable.

In step 3, it is judged from the current engine rotational speed N1 (that is, the rotational speed of the input shaft 11 of the torque converter 10) and from the engine load Tp, if the existing operating conditions are within the predetermined operating range (operating range for producing the predetermined slip ratio). If so, control proceeds to step 4, while if not, the learning routine is terminated.

In step 4, the slip ratio $a_n$ (=VSP/(k×N1) where k is a constant) is computed. This can of course be obtained from the ratio of N2 to N1 after converting the vehicle speed VSP into the torque converter output shaft rotational speed N2. Moreover, a rotation sensor may be provided on the output shaft 15, so that the torque converter output shaft rotational speed N2 can be obtained directly. However, if, as with the present embodiments, the signals from the crank angle sensor 23 and the vehicle speed sensor 27 are used, then additional sensors need not be provided, this minimizing costs.

Step 4 constitutes the slip condition detection device of the present invention.

In step 5, a weighted mean value "a" of the slip ratio $a_n$ (=((n-1)×a+$a_n$)/ n) is computed. Then, in step 6, the computed weighted mean value "a" is updated in the memory of the control unit 50.

The above is the learning routine for the slip ratio.

Figure 4:
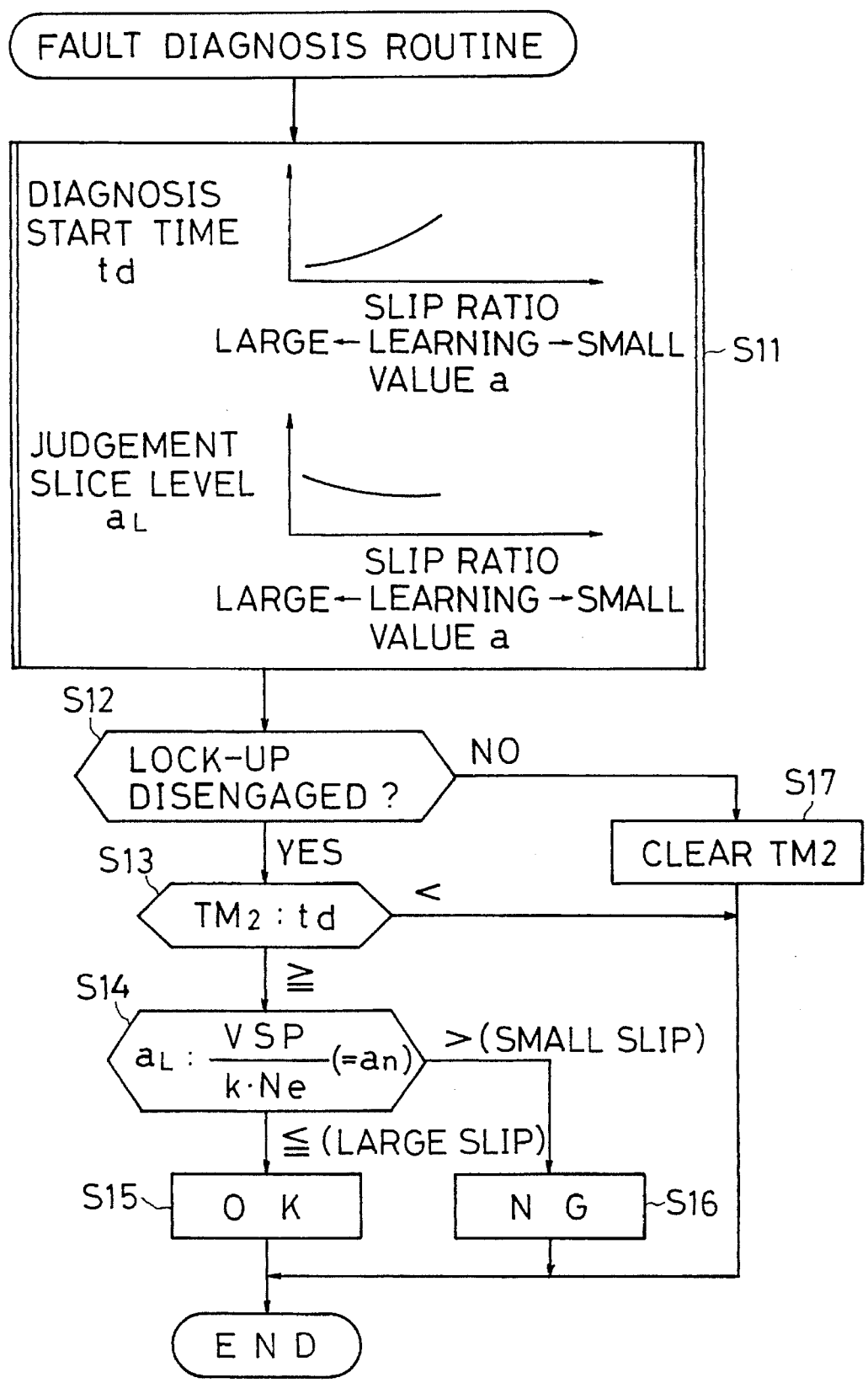
FIG. 4 is a flow chart for explaining a fault diagnosis control routine for the lock-up mechanism in a first embodiment.

Referring now to the flow chart of FIG. 4 showing a first embodiment, a lock-up mechanism fault diagnosis routine carried out in the control unit 50, for diagnosing whether or not the lock-up mechanism is operating with the required response speed, will now be explained. The control unit 50 with this function, thus functions as the fault diagnosis device of the present invention.

In step 11, depending on the weighted mean value "a", a diagnosis start time $t_d$ from issue of a disengage signal until start of the diagnosis, and a judgement slice level $a_L$ for the diagnosis, are retrieved from a map or the like which has been verified for example, by prior experiment and stored in the control unit 50. The reason for changing the diagnosis start time td and the judgement slice level $a_L$ together, is so that the diagnosis start time td can be shortened while maintaining a high judgement accuracy (refer to FIG. 5). However, it will be understood, as mentioned later, that it is possible to change only the diagnosis start time td (refer to FIG. 6), or with the diagnosis start time td set short, it is possible to change only the diagnosis judgement slice level $a_L$ corresponding to the viscosity of the operating fluid 13 (refer to FIG. 8).

Step 11 constitutes the diagnosis condition correction device of the present invention.

In step 12, it is judged if a disengage signal for the lock-up clutch 19 (that is, a disengage command to the lock-up mechanism) is being sent to the lock-up solenoid 20. If so, control proceeds to step 13 to continue fault diagnosis, while if not, control proceeds to step 17 where an elapsed time TM2 from issue of the disengage signal is cleared, and the routine is then terminated.

In step 13, the elapsed time TM2 from issue of the disengage signal is compared with the time td newly set in step 11 for the time until diagnosis starts. If TM2≧td, control proceeds to step 14, while if TM2<td, the routine repeats until TM2≧td.

In step 14, the judgement slice level $a_L$ set in step 11, is compared with the current slip ratio $a_n$ (=vehicle speed VSP/(k×N1), where k is a constant). If $a_L \leq a_n$, control proceeds to step 15, while if $a_L > a_n$, control proceeds to step 16.

In step 15, since the current slip ratio $a_n$ is above the predetermined slip ratio $a_L$, it is judged that the lock-up mechanism has disengaged with a normal response speed, and is thus diagnosed as operating normally.

On the other hand, in step 16, since the current slip ratio $a_n$ is less than the predetermined slice level $a_L$, it is judged that the lock-up mechanism has disengaged at a response speed slower than the normal response speed. For example it is judged that a restriction in the hydraulic supply system to the lock-up solenoid 20 is above a prescribed value, or the opening and closing speed of the lock-up solenoid 20 itself has dropped more than a predetermined value, so that the lock-up mechanism is diagnosed to be faulty. In this case, a warning device such as a light provided in the driving cab may come on, to bring this to the attention of the driver for appropriate action.

In this way, with the present embodiment, since the fault diagnosis start time td, and/or the judgement level $a_L$ are changed in accordance with the learned value "a" of the slip ratio $a_n$, that is to say in accordance with the change in viscosity of the operating fluid 13, then the large delay for the fault diagnosis start time which is conventionally set assuming a maximum viscosity for the operating fluid 13 is not necessary. Hence fault diagnosis of the lock-up mechanism can be carried out at a response speed based on the change of the viscosity of the operating fluid 13.

More specifically, since a drop in the reduction rate of the hydraulic pressure supplied to the lock-up clutch 19, due to the amount of restriction in the hydraulic supply system to the lock-up solenoid 20, or a drop in the transitional operating response speed of the lock-up mechanism due for example to a drop in the opening or closing speed of the lock-up solenoid 20 itself, can be detected to a high accuracy, then it is possible to diagnose to a high accuracy whether or not rapid lock-up mechanism disengagement occurring for example in city driving and the like, is being carried out as required. Furthermore, by bringing such a fault to the attention of the driver for appropriate action, deterioration in fuel consumption, exhaust composition, and drivability and the like, under operating conditions such as city driving can be significantly reduced.

Figure 6:
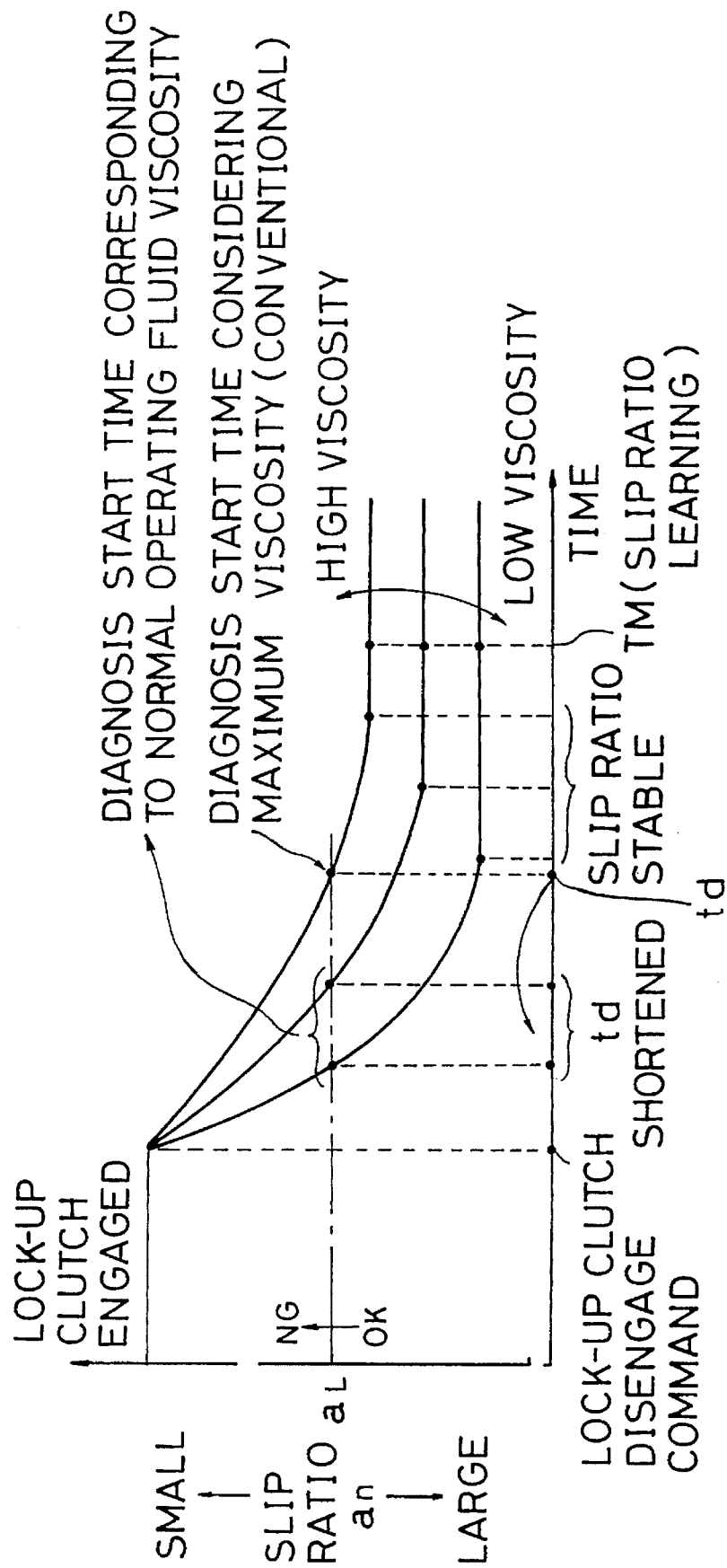
FIG. 6 is a time chart for explaining operations in a fault diagnosis step and device of a second embodiment.
Figure 7:
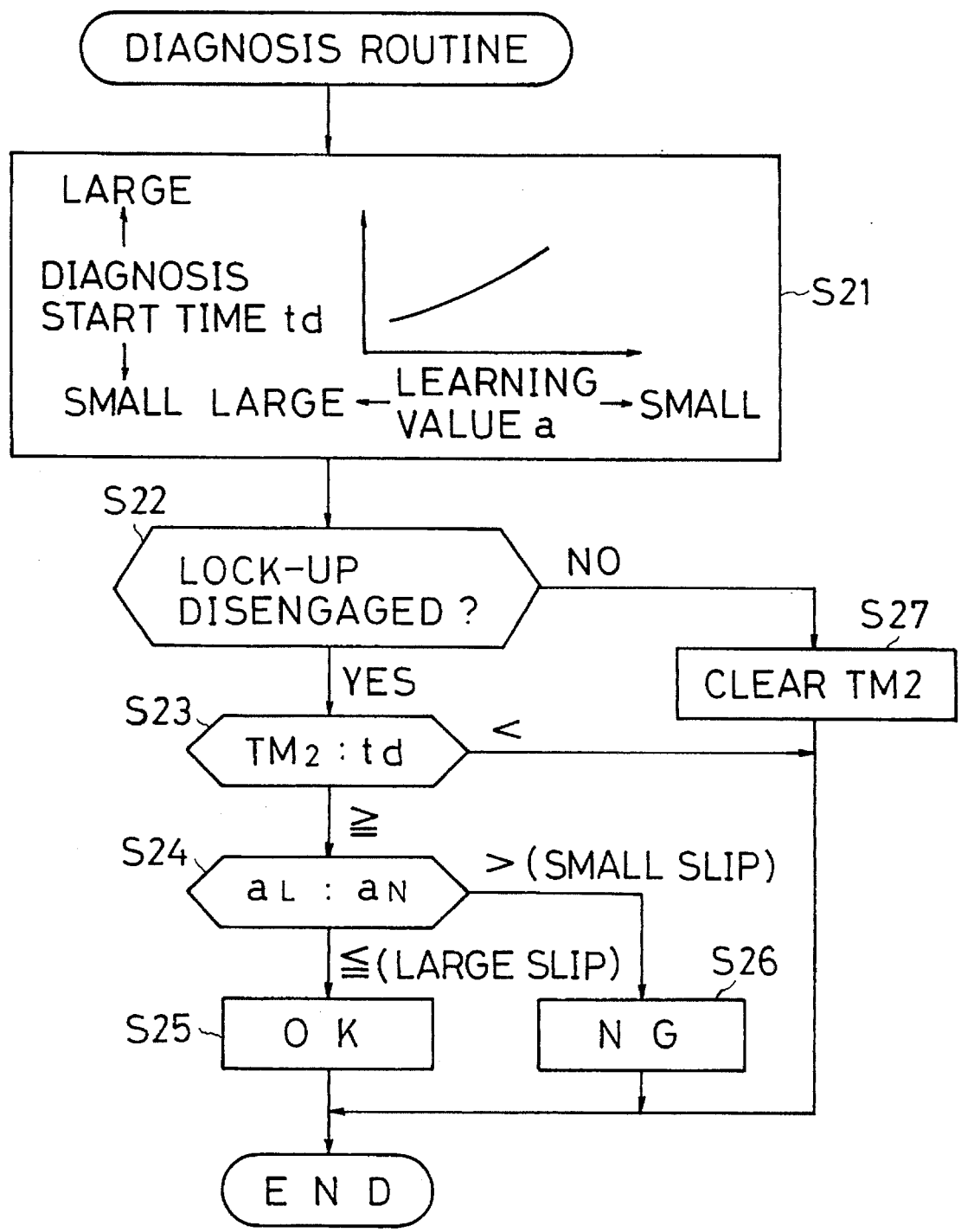
FIG. 7 is a flow chart for explaining a fault diagnosis control routine of a lock-up mechanism in the fault diagnosis step and device of the second embodiment.

With the first embodiment, in the diagnosis routine, the fault diagnosis start time td, and the judgement level $a_L$ are both changed in accordance with the learned value "a" of the slip ration $a_n$, that is to say in accordance with the change in viscosity of the operating fluid 13, so that the diagnosis start time td can be shortened while maintaining a high judgement accuracy (corresponding to claim however, it will be understood as shown in FIG. 6 corresponding to a second embodiment, that it is possible to change only the diagnosis start time td, with the judgement level $a_L$ as a constant. In this case also, since the diagnosis can be started at a diagnosis start time matched to the normally used viscosity of the operating fluid 13, and since the diagnosis start time td set in the conventional manner in consideration of a maximum viscosity can be shortened, then it is possible to diagnose whether or not the operation can follow the demands for rapid lock-up mechanism disengagement, while also simplifying the control logic (corresponding to claim 2. Refer to the flow chart of FIG. 7).

Figure 8:
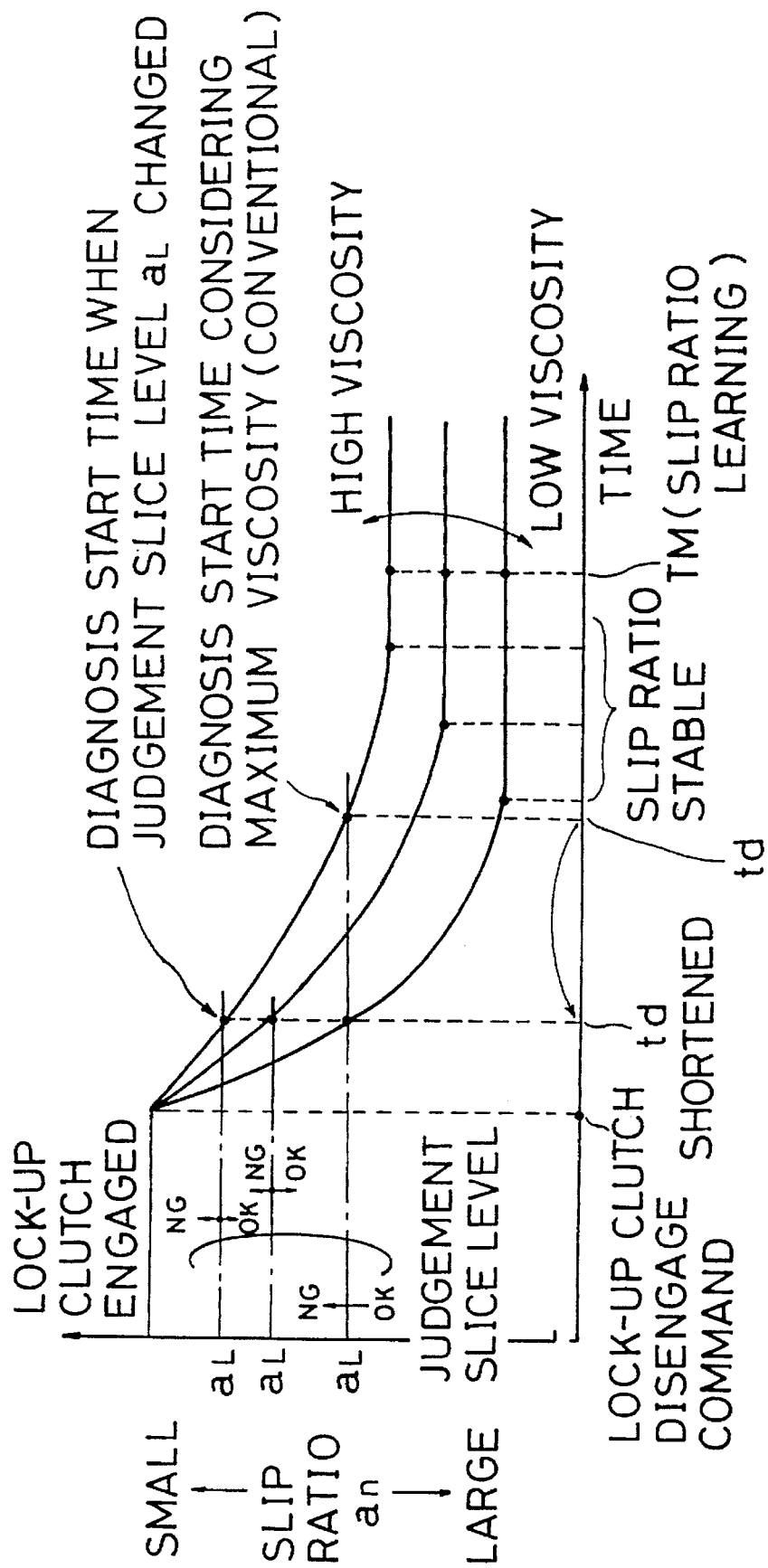
FIG. 8 is a time chart for explaining operations in a fault diagnosis step and device of a third embodiment.
Figure 9:
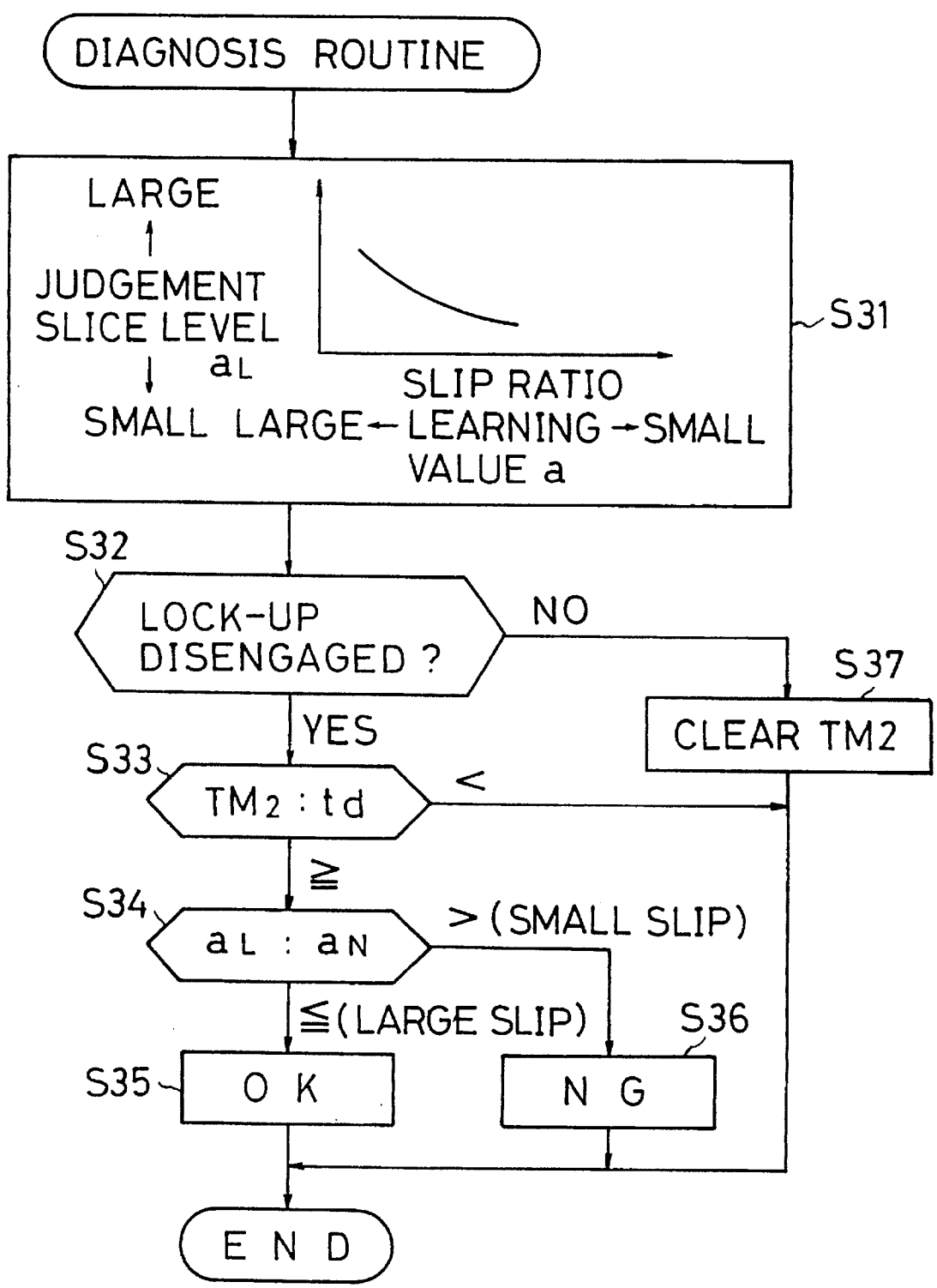
FIG. 9 is a flow chart for explaining a fault diagnosis control routine of a lock-up mechanism in the fault diagnosis step and device of the third embodiment.

Moreover, as shown in FIG. 8 corresponding to a third embodiment, if the judgement slice level $a_L$ is changed corresponding to the viscosity of the operating fluid 13, then even if the diagnosis start time td is shortened beforehand, fault diagnosis can still be made to a high accuracy. Therefore, the delay in the diagnosis start time conventionally set in consideration of the maximum viscosity is not necessary. Accordingly, since the diagnosis start time td can be significantly shortened, then it is possible to diagnose whether or not the operation can follow the demands for rapid lock-up mechanism disengagement, while also simplifying the control logic (corresponding to claim 3. Refer to the flow chart of FIG. 9).

Figure 10:
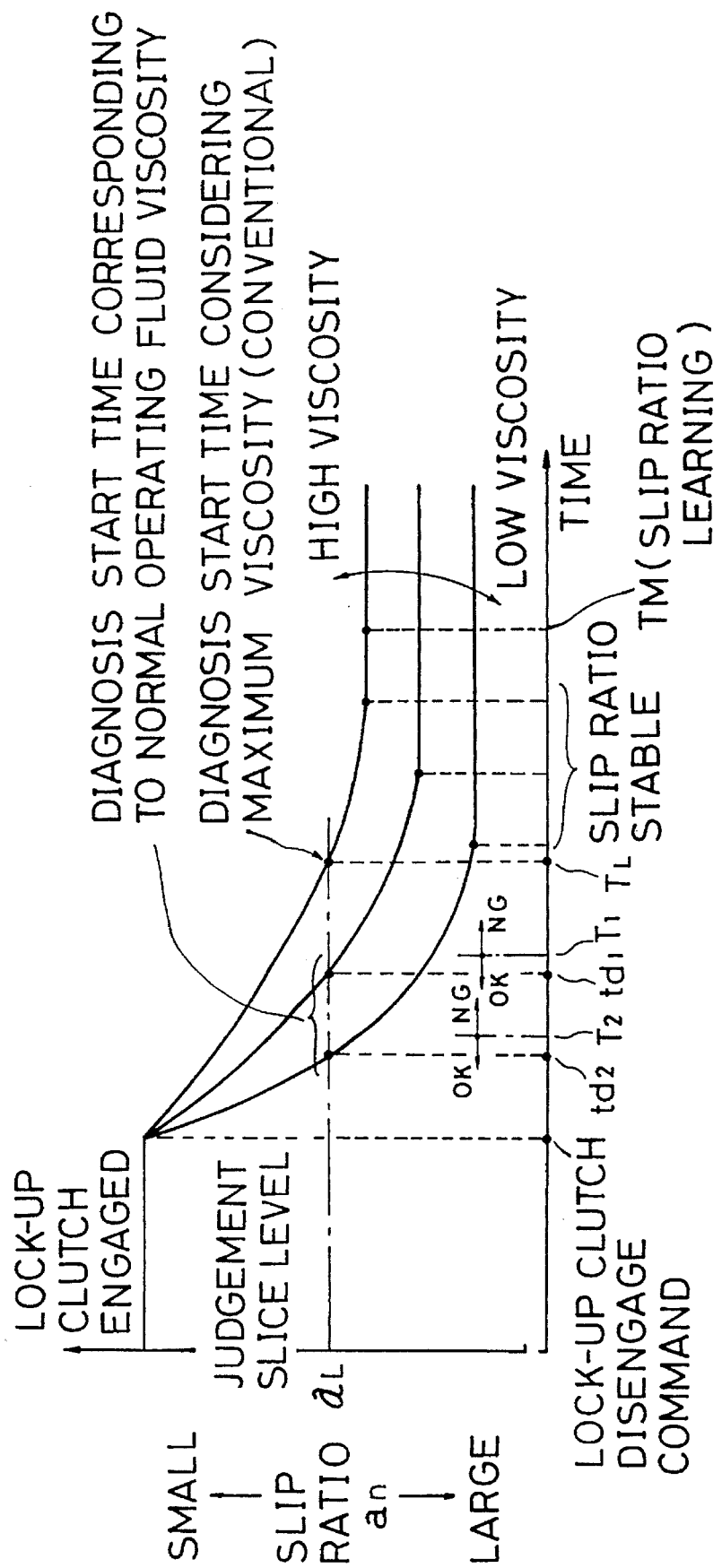
FIG. 10 is a time chart for explaining operations in a fault diagnosis step and device of a fourth embodiment.
Figure 11:
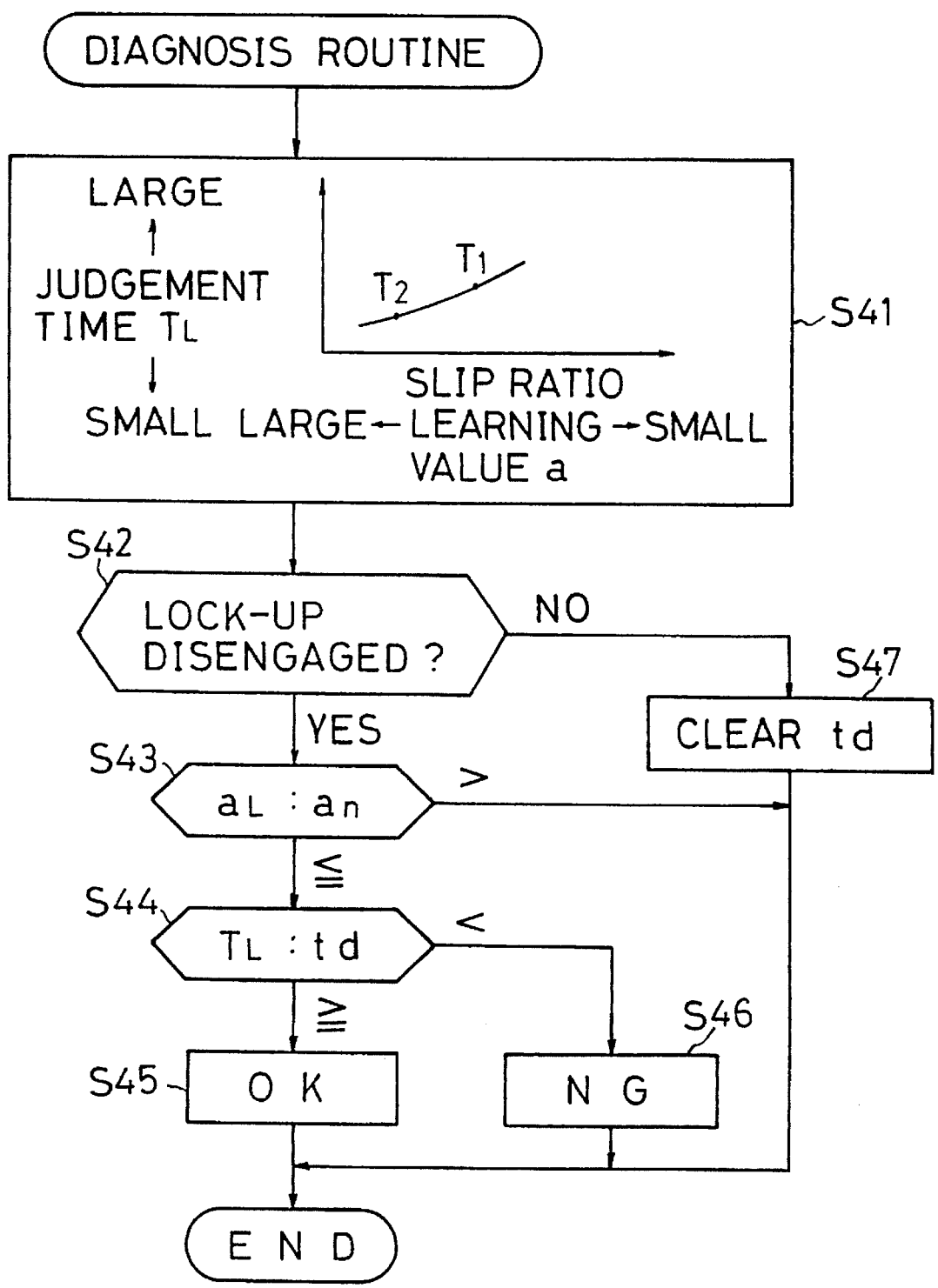
FIG. 11 is a flow chart for explaining a fault diagnosis control routine of a lock-up mechanism in the fault diagnosis step and device of the fourth embodiment.

As shown in FIG. 10 corresponding to a fourth embodiment, when the construction is such that the fault diagnosis device diagnoses a fault in the lock-up mechanism by comparing a required time T from issue of a disengage command to the lock-up mechanism until a slip ration $a_n$ of the torque converter 10 reaches a previously determined judgement slice level $a_L$, with a previously determined judgement time TL, then the judgement time TL is corrected, in accordance with the learned result "a" of the slip ration $a_n$, to T1, T2 corresponding to the change in the viscosity of the operating fluid 13. Then even with a construction wherein the required time td (expressed respectively as td1, td2 in FIG. 10) from initial issue of the disengage signal to the lock-up mechanism until the time when the existing slip ration $a_n$ reaches the judgement slice level $a_L$ is detected, and respectively compared with the judgement times T1, T2 (the invention disclosed in claim 5), since the diagnosis can be started at a diagnosis start time matched to the normally used viscosity of the operating fluid 13, and since the judgement time TL set in the conventional manner in consideration of a maximum viscosity can be effectively shortened, then it is still possible to diagnose whether or not the operation can follow the demands for rapid lock-up mechanism disengagement (refer to the flow chart of FIG. 11 ).

Figure 12:
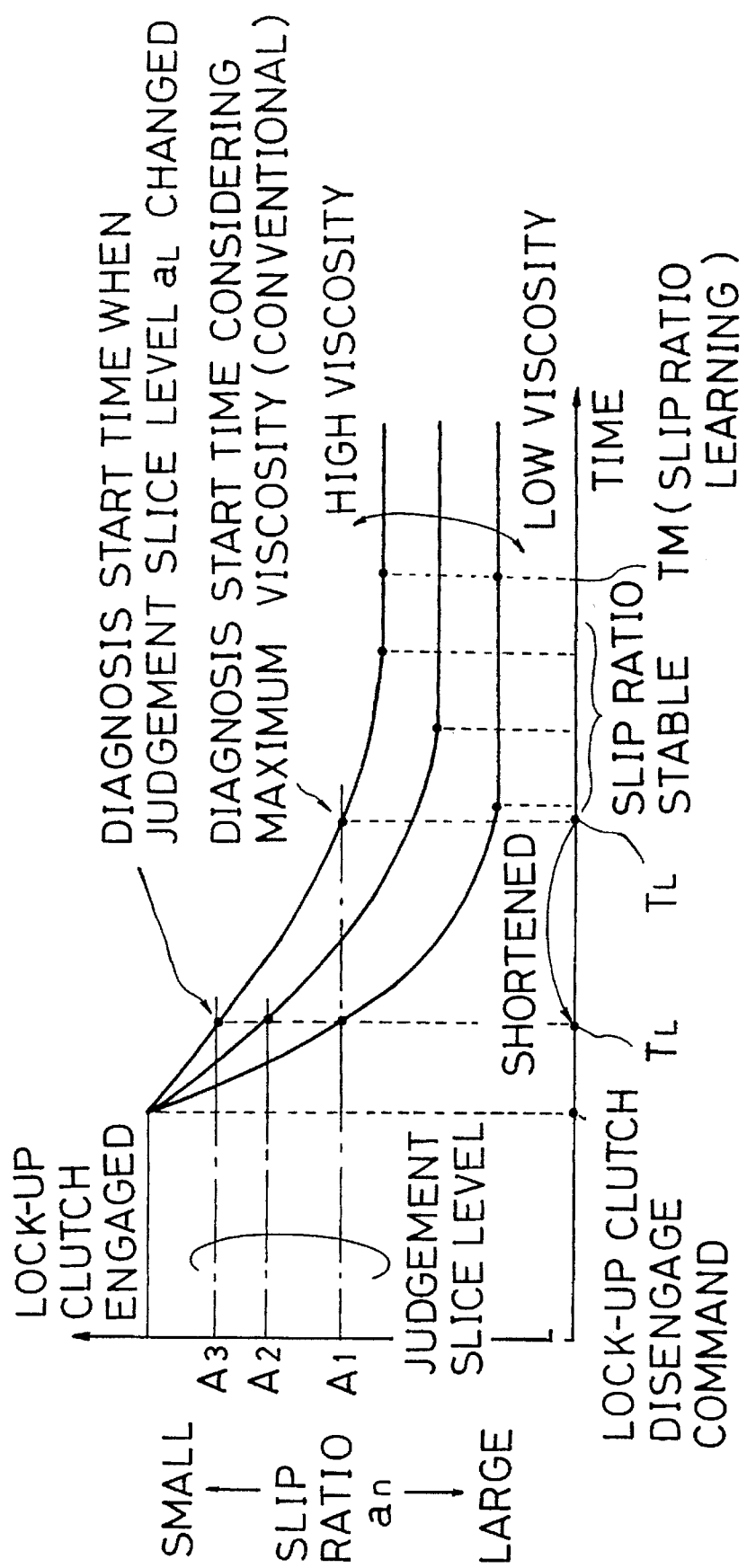
FIG. 12 is a time chart for explaining operations in a fault diagnosis step and device of a fifth embodiment.
Figure 13:
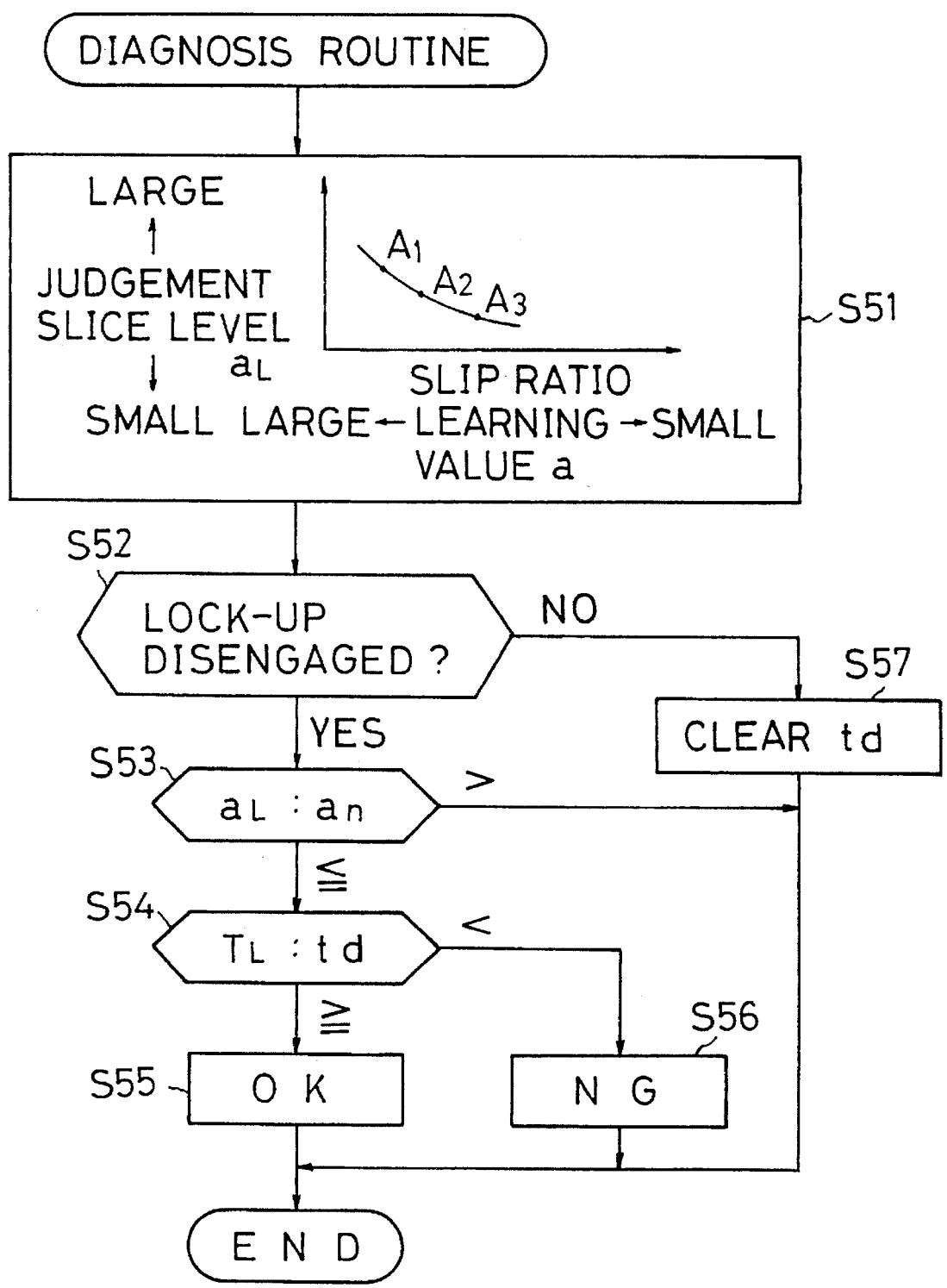
FIG. 13 is a flow chart for explaining a fault diagnosis control routine of a lock-up mechanism in the fault diagnosis step and device of the fifth embodiment.

As shown in FIG. 12 corresponding to a fifth embodiment, in the case where the fault diagnosis device has the abovementioned construction, and the judgement slice level $a_L$ is corrected, in accordance with the learned result "a" of the slip ration $a_n$, to A1, A2, A3 corresponding to the change in the viscosity of the operating fluid 13, then if the construction is such that the required time td from initial issue of the disengage signal to the lock-up mechanism until the time when the existing slip ration $a_n$ reaches the judgement slice levels A1, A2, A3 is detected, and the required time td and a previously set judgement time TL are compared (corresponding to claim 6), then even if the judgement time TL is previously set shorter, fault diagnosis can still be carried out at a high accuracy corresponding to the viscosity of the operating fluid 13. Therefore, the delay in the diagnosis start time conventionally set in consideration of a maximum viscosity is not necessary. Accordingly, since the diagnosis start time td1 can be significantly shortened, then it is possible to diagnose whether or not the operation can follow the demands for rapid lock-up mechanism disengagement, while also simplifying the control logic (Refer to the flow chart of FIG. 13).

Figure 14:
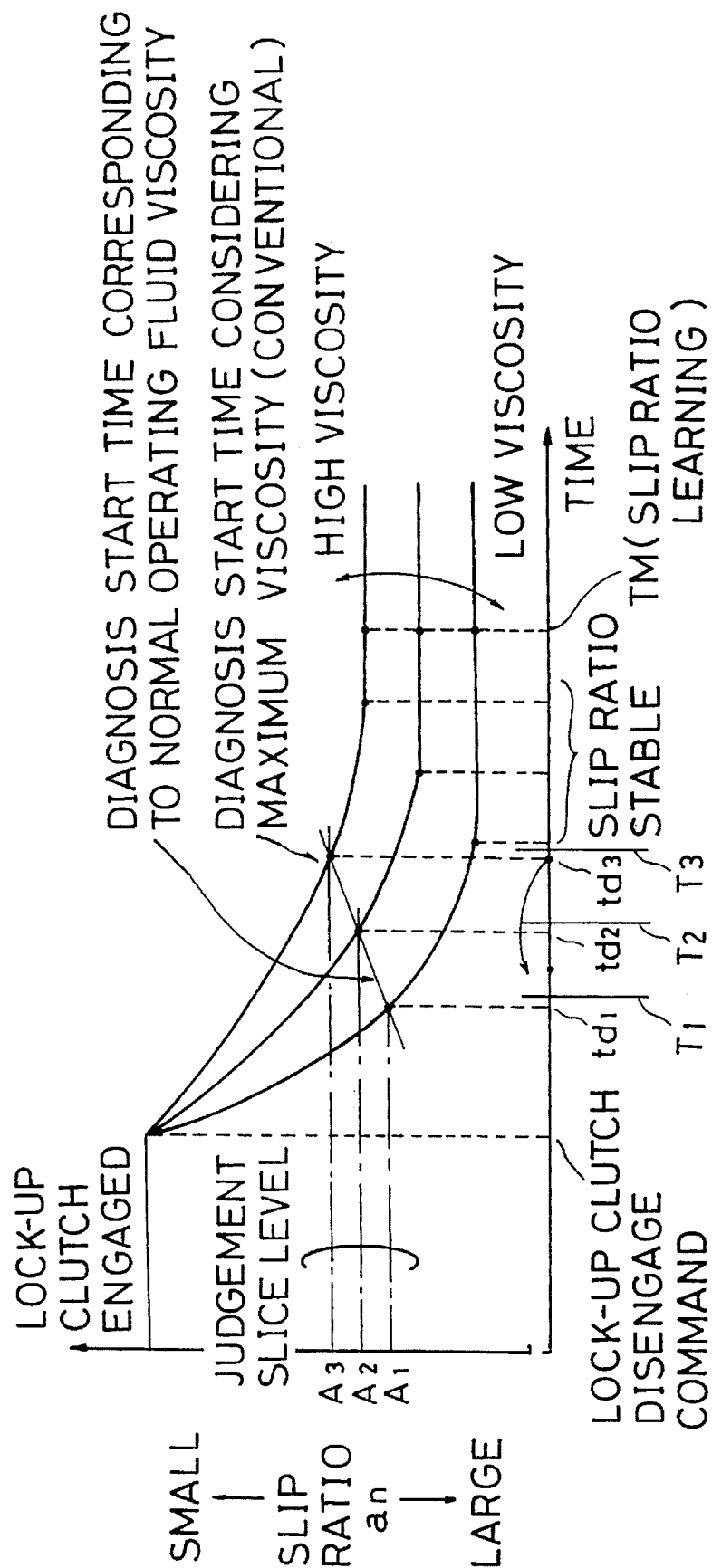
FIG. 14 is a time chart for explaining operations in a fault diagnosis step and device of a sixth embodiment.

As shown in FIG. 14 corresponding to a sixth embodiment, in the case where the fault diagnosis device has the abovementioned construction, and the judgement slice level $a_L$ is corrected, in accordance with the learned result "a" of the slip ration $a_n$, to A1, A2, A3 corresponding to the change in the viscosity of the operating fluid 13, then if the construction is such that the required times td1, td2, td3 from initial issue of the disengage signal to the lock-up mechanism until the time when the existing slip ration $a_n$ reaches the judgement slice levels A1, A2, A3 are detected, and respectively compared with judgement times T1, T2, T3 previously set to correspond to the required times (corresponding to claim 7), then it will be evident, as with the beforementioned flow chart of FIG. 4, that the diagnosis start time td can be shortened, while maintaining a high diagnosis accuracy.

Figure 15:
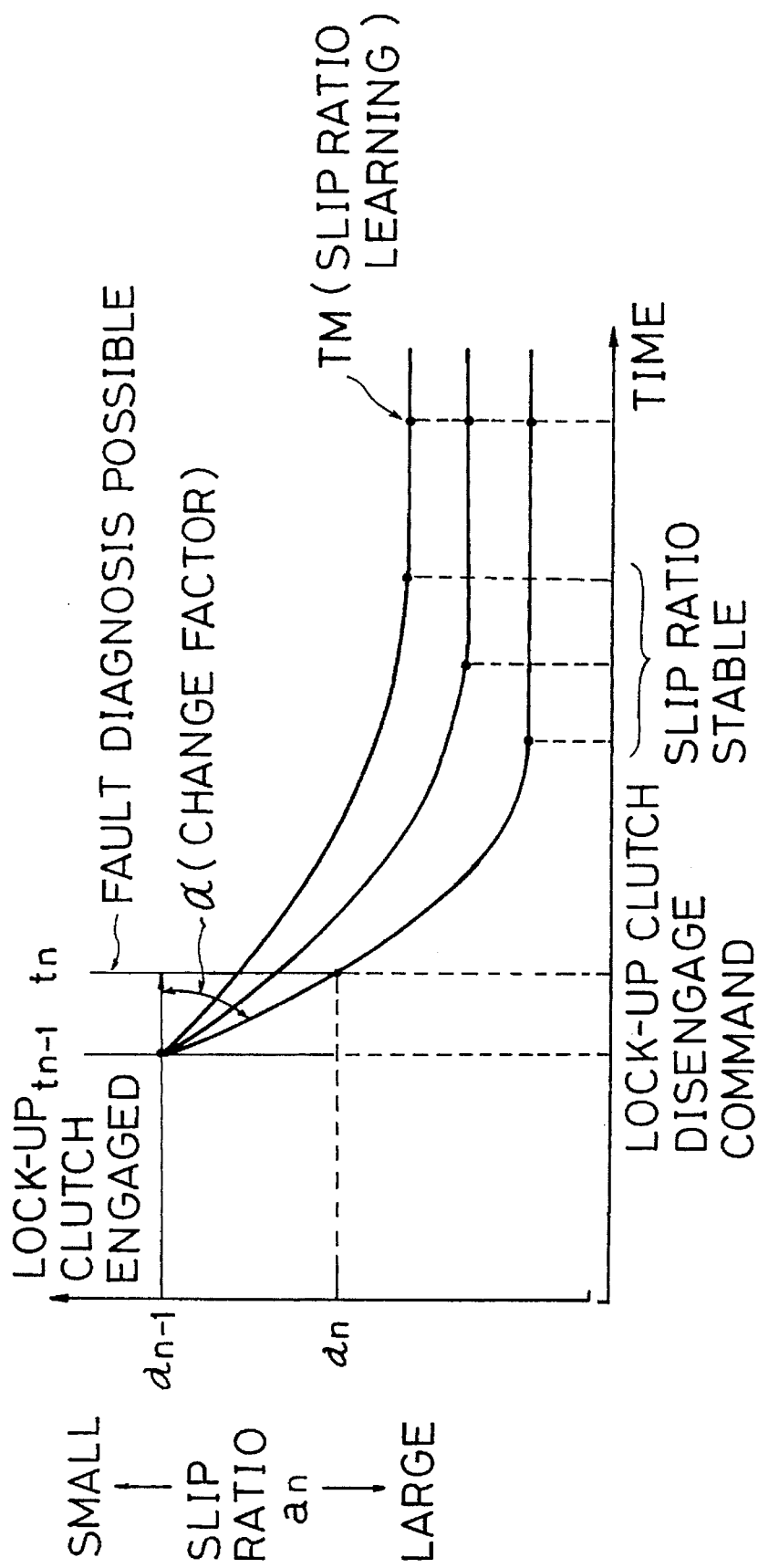
FIG. 15 is a time chart for explaining operations in a fault diagnosis step and device of a seventh embodiment.
Figure 16:
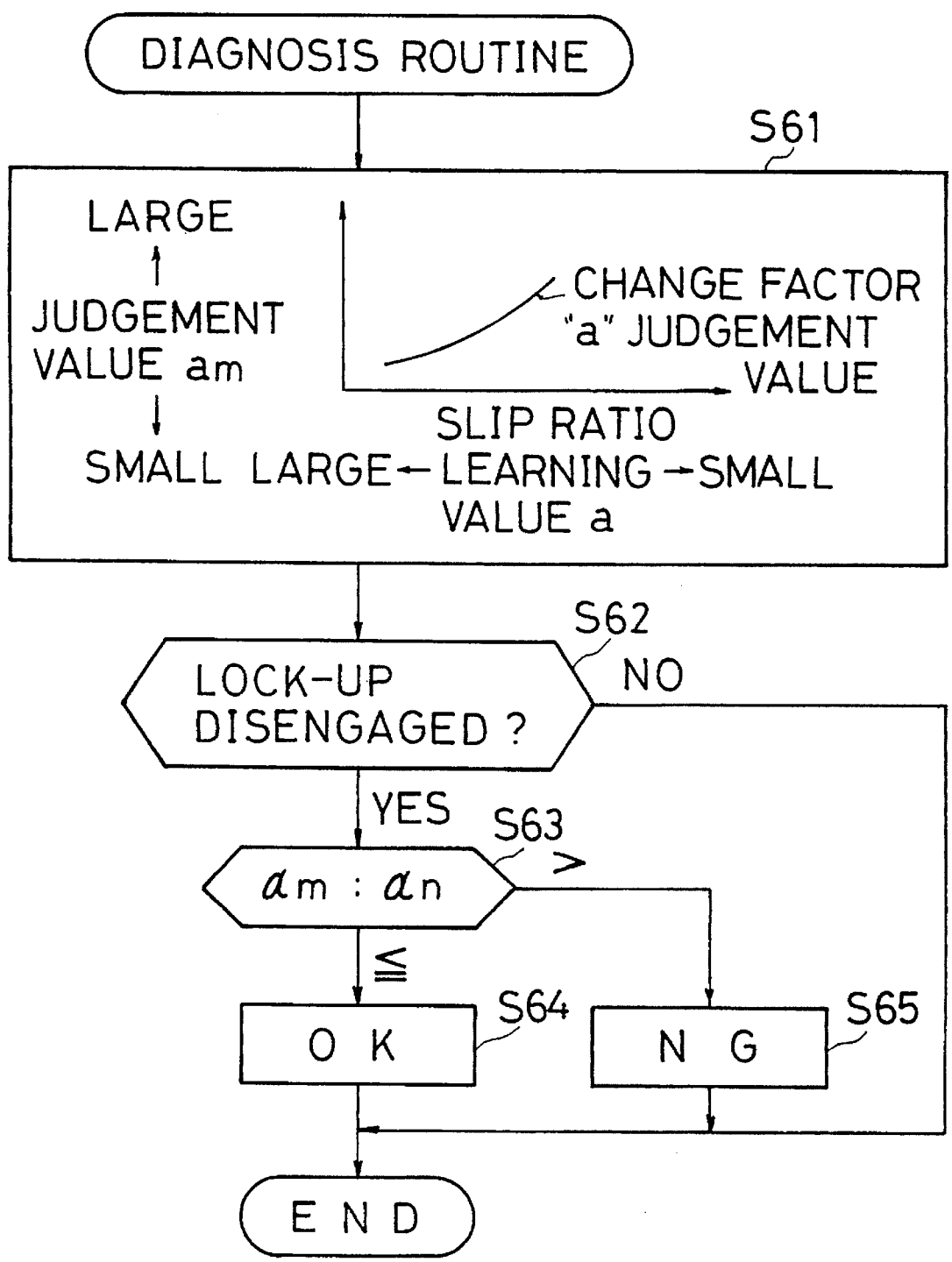
FIG. 16 is a flow chart for explaining a fault diagnosis control routine of a lock-up mechanism in a fault diagnosis step and device of the seventh embodiment.

As shown in FIG. 15 corresponding to a seventh embodiment, a change factor a $(=(a_n-a_{n-1})/(t_n-t_{n-1})$, where t represents time, and n, n–1 are subscripts for current and previous) of the slip ration $a_n$ occurring after the disengage command to the lock-up clutch 19, can be detected as the diagnosis condition occurring after issue of the disengage command to the lock-up clutch 19. The detected change factor a can then be compared with a judgement value $a_m$ which is suitably modified to correspond to the learning result, to diagnose a fault in the lock-up mechanism. In this case, compared to the previous embodiments, since the change factor a can be detected immediately after issue of the disengage command, then fault diagnosis can be carried out in a very short time (corresponding to claim 8. Refer to the flow chart of FIG. 16). Accordingly, it is possible to diagnose, if normal lock-up mechanism disengagement is being made at high response speeds which follow a demand for very rapid lock-up mechanism disengagement. The deterioration in fuel consumption, exhaust composition, and drivability and the like, under operating conditions such as city driving can thus be kept to a minimum.

When the learning value "a" of the slip ration $a_n$ obtained in the present embodiments becomes greater than a predetermined value, then it is judged that the operating fluid 13 has reached its useful limit, and this can be indicated by a warning light to tell the driver to change the operating fluid 13.

Moreover, the temperature of the operating fluid 13 can be detected, and the viscosity of the operating fluid 13 which bears a mutual relation to the temperature, as well as an appropriate value for the learned value "a" of the slip ration $a_n$ can be estimated to some degree (this can be to a higher accuracy if viscosity deterioration due to accumulated use time or accumulated running distance is taken into consideration). It then becomes possible to modify the elapsed time td and the judgement slice level $a_L$ in accordance with the estimated viscosity or the appropriate value for the learned value "a". In this case, since the slip ratio need not be learnt, then even though the engine operation may not protrude into the learning region so that learning is not possible, the abovementioned lock-up mechanism fault diagnosis can be quickly started, based on the presumed viscosity of the operating fluid 13 within a comparatively short time immediately after starting driving.

In the above embodiments, the learned value "a" of the slip ration $a_n$ can be obtained for each operating condition, and treated by averaging and the like to reduce the learning error.

We claim:

1. A method of diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the method comprising the steps of:

detecting a rotational speed of the input shaft of the torque converter;

detecting a rotational speed of the output shaft of the torque converter;

detecting a slip condition of the torque converter based on the detected input shaft rotational speed and the detected output shaft rotational speed;

diagnosing a fault in the lock-up mechanism by comparing a slip condition of the torque converter after lapse of a predetermined time from issuance of a disengage command to the lock-up mechanism with a previously determined judgment value;

learning a slip condition of the torque converter at a predetermined operating condition with the lock-up mechanism disengaged; and correcting the predetermined time as a diagnosis condition of the fault diagnosis step in accordance with the learned result of the slip condition.

2. A method of diagnosing a fault in a lock-up mechanism of a torque converter in an automatic transmission according to claim 1, wherein the slip condition learning step is carrier out after lapse of a predetermined time from issuance of a disengage command to the lock-up mechanism.

3. A method of diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the method comprising the steps of:

detecting a rotational speed of the input shaft of the torque converter;

detecting a rotational speed of the output shaft of the torque converter;

detecting a slip condition of the torque converter based on the detected input shaft rotational speed and the detected output shaft rotational speed;

diagnosing a fault in the lock-up mechanism by comparing a slip condition of the torque converter after lapse of a predetermined time from issuance of a disengage command to the lock-up mechanism with a previously determined judgment value;

learning a slip condition of the torque converter at a predetermined operating condition with the lock-up mechanism disengaged; and correcting the predetermined time and the judgment value as diagnosis conditions of the fault diagnosis step in accordance with the learned result of the slip condition.

4. A method of diagnosing a fault in a lock-up mechanism of a torque converter in an automatic transmission according to claim 3, wherein the slip condition learning step is carrier out after lapse of a predetermined time from issuance of a disengage command to the lock-up mechanism.

5. A method of diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the method comprising the steps of:

detecting a rotational speed of the input shaft of the torque converter;

detecting a rotational speed of the output shaft of the torque converter;

detecting a slip condition of the torque converter based on the detected input shaft rotational speed and the detected output shaft rotational speed;

diagnosing a fault in the lock-up mechanism by comparing the required time from issuance of a disengage command to the lock-up mechanism until a slip condition of the torque converter reaches a previously determined judgment value, with a previously determined judgment time;

learning a slip condition of the torque converter at a predetermined operating condition with the lock-up mechanism disengaged; and correcting the judgment time as a diagnosis condition of the fault diagnosis step in accordance with the learned result of the slip condition.

6. A method of diagnosing a fault in a lock-up mechanism of a torque converter in an automatic transmission according to claim 5, wherein the slip condition learning step is carrier out after lapse of a predetermined time from issuance of a disengage command to the lock-up mechanism.

7. A method of diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the method comprising the steps of:

detecting a rotational speed of the input shaft of the torque converter;

detecting a rotational speed of the output shaft of the torque converter;

detecting a slip condition of the torque converter based on the detected input shaft rotational speed and the detected output shaft rotational speed;

diagnosing a fault in the lock-up mechanism by comparing the required time from issuance of a disengage command to the lock-up mechanism until a slip condition of the torque converter reaches a previously determined judgment value, with a previously determined judgment time;

learning a slip condition of the torque converter at a predetermined operating condition with the lock-up mechanism disengaged; and correcting the judgment value as a diagnosis condition of the fault diagnosis step in accordance with the learned result of the slip condition.

8. A method of diagnosing a fault in a lock-up mechanism of a torque converter in an automatic transmission according to claim 7, wherein the slip condition learning step is carrier out after lapse of a predetermined time from issuance of a disengage command to the lock-up mechanism.

9. A method of diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the method comprising the steps of:

detecting a rotational speed of the input shaft of the torque converter;

detecting a rotational speed of the output shaft of the torque converter;

detecting a slip condition of the torque converter based on the detected input shaft rotational speed and the detected output shaft rotational speed;

diagnosing a fault in the lock-up mechanism by comparing the required time from issuance of a disengage command to the lock-up mechanism until a slip condition of the torque converter reaches a previously determined judgment value, with a previously determined judgment time;

learning a slip condition of the torque converter at a predetermined operating condition With the lock-up mechanism disengaged; and correcting the judgment time and the judgment value as diagnosis conditions of the fault diagnosis step in accordance with the learned result of the slip condition.

10. A method of diagnosing a fault in a lock-up mechanism of a torque converter in an automatic transmission according to claim 9, wherein the slip condition learning step is carrier out after lapse of a predetermined time from issuance of a disengage command to the lock-up mechanism.

11. A method of diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the method comprising the steps of:

detecting a rotational speed of the input shaft of the torque converter;

detecting a rotational speed of the output shaft of the torque converter;

detecting a slip condition of the torque converter based on the detected input shaft rotational speed and the detected output shaft rotational speed;

diagnosing a fault in the lock-up mechanism by comparing a change factor for the slip conditions of the torque converter, which slip conditions change after issuance of a disengage command to the lock-up mechanism, with a previously determined judgment value;

learning a slip condition of the torque converter at a predetermined operating condition with the lock-up mechanism disengaged; and correcting the judgment value as a diagnosis condition of the fault diagnosis step in accordance with the learned result of the slip condition.

12. A method of diagnosing a fault in a lock-up mechanism of a torque converter in an automatic transmission according to claim 11, wherein the slip condition learning step is carrier out after lapse of a predetermined time from issuance of a disengage command to the lock-up mechanism.

13. An apparatus for diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the apparatus comprising:

an input shaft rotational speed detecting means for detecting a rotational speed of the input shaft of the torque converter;

an output shaft rotational speed detecting means for detecting a rotational speed of the output shaft of the torque converter;

a slip detecting means for detecting a slip condition of the torque converter based on the detected input shaft rotational speed and the detected output shaft rotational speed;

a fault diagnosing means for diagnosing a fault in the lock-up mechanism by comparing a slip condition of the torque converter after lapse of a predetermined time from issuance of a disengage command to the lock-up mechanism with a previously determined judgment value;

a slip condition learning means for learning a slip condition of the torque converter at a predetermined operating condition with the lock-up mechanism disengaged; and a diagnosis condition correction means for correcting the predetermined time as a diagnosis condition of the fault diagnosis step in accordance with the learned result of the slip condition.

14. An apparatus for diagnosing a fault in a lock-up mechanism of a torque converter in an automatic transmission according to claim 13, wherein the slip condition learning is carrier out after lapse of a predetermined time from issuance of a disengage command to the lock-up mechanism.

15. An apparatus for diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the apparatus comprising:

an input shaft rotational speed detecting means for detecting a rotational speed of the input shaft of the torque converter;

an output shaft rotational speed detecting means for detecting a rotational speed of the output shaft of the torque converter;

a slip detecting means for detecting a slip condition of the torque converter based on the detected input shaft rotational speed and the detected output shaft rotational speed;

a fault diagnosing means for diagnosing a fault in the lock-up mechanism by comparing a slip condition of the torque converter after lapse of a predetermined time from issuance of a disengage command to the lock-up mechanism with a previously determined judgment value;

a slip condition learning means for learning a slip condition of the torque converter at a predetermined operating condition with the lock-up mechanism disengaged; and a diagnosis condition correction means for correcting the predetermined time and judgment value as diagnosis conditions of the fault diagnosis step in accordance with the learned result of the slip condition.

16. An apparatus for diagnosing a fault in a lock-up mechanism of a torque converter in an automatic transmission according to claim 15, wherein the slip condition learning is carrier out after lapse of a predetermined time from issuance of a disengage command to the lock-up mechanism.

17. An apparatus for diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the apparatus comprising:

an input shaft rotational speed detecting means for detecting a rotational speed of the input shaft of the torque converter;

an output shaft rotational speed detecting means for detecting a rotational speed of the output shaft of the torque converter;

a slip detecting means for detecting a slip condition of the torque converter based on the detected input shaft rotational speed and the detected output shaft rotational speed;

a fault diagnosing means for diagnosing a fault in the lock-up mechanism by comparing the required time from issuance of a disengage command to the lock-up mechanism until a slip condition of the torque converter reaches a previously determined judgment value, with a previously determined judgment time;

a slip condition learning means for learning a slip condition of the torque converter at a predetermined operating condition with the lock-up mechanism disengaged; and a diagnosis condition correction means for correcting the judgment time as a diagnosis condition of the fault diagnosis step in accordance with the learned result of the slip condition.

18. An apparatus for diagnosing a fault in a lock-up mechanism of a torque converter in an automatic transmission according to claim 17, wherein the slip condition learning is carrier out after lapse of a predetermined time from issuance of a disengage command to the lock-up mechanism.

19. An apparatus for diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the apparatus comprising:

an input shaft rotational speed detecting means for detecting a rotational speed of the input shaft of the torque converter;

an output shaft rotational speed detecting means for detecting a rotational speed of the output shaft of the torque converter;

a slip detecting means for detecting a slip condition of the torque converter based on the detected input shaft rotational speed and the detected output shaft rotational speed;

a fault diagnosing means for diagnosing a fault in the lock-up mechanism by comparing the required time from issuance of a disengage command to the lock-up mechanism until a slip condition of the torque converter reaches a previously determined judgment value, with a previously determined judgment time;

a slip condition learning means for learning a slip condition of the torque converter at a predetermined operating condition with the lock-up mechanism disengaged; and a diagnosis condition correction means for correcting the judgment value as a diagnosis condition of the fault diagnosis step in accordance with the learned result of the slip condition.

20. An apparatus for diagnosing a fault in a lock-up mechanism of a torque converter in an automatic transmission according to claim 19, wherein the slip condition learning is carrier out after lapse of a predetermined time from issuance of a disengage command to the lock-up mechanism.

21. An apparatus for diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the apparatus comprising:

an input shaft rotational speed detecting means for detecting a rotational speed of the input shaft of the torque converter;

an output shaft rotational speed detecting means for detecting a rotational speed of the output shaft of the torque converter;

a slip detecting means for detecting a slip condition of the torque converter based on the detected input shaft rotational speed and the detected output shaft rotational speed;

a fault diagnosing means for diagnosing a fault in the lock-up mechanism by comparing the required time from issuance of a disengage command to the lock-up mechanism until a slip condition of the torque converter reaches a previously determined judgment value, with a previously determined judgment time;

a slip condition learning means for learning a slip condition of the torque converter at a predetermined operating condition with the lock-up mechanism disengaged; and a diagnosis condition correction means for correcting the judgment time and value as diagnosis conditions of the fault diagnosis step in accordance with the learned result of the slip condition.

22. An apparatus for diagnosing a fault in a lock-up mechanism of a torque converter in an automatic transmission according to claim 21, wherein the slip condition learning is carrier out after lapse of a predetermined time from issuance of a disengage command to the lock-up mechanism.

23. An apparatus for diagnosing a fault in a lock-up mechanism of a torque converter in an automatic transmission, the torque converter being connected to an output shaft of a vehicle engine, wherein the lock-up mechanism is provided for mechanically coupling input and output shafts of the torque converter, the apparatus comprising:

an input shaft rotational speed detecting means for detecting a rotational speed of the input shaft of the torque converter;

an output shaft rotational speed detecting means for detecting a rotational speed of the output shaft of the torque converter;

a slip detecting means for detecting a slip condition of the torque converter based on the detected input shaft rotational speed and the detected output shaft rotational speed;

a fault diagnosing means for diagnosing a fault in the lock-up mechanism by comparing a change factor for the slip conditions of the torque converter, which slip conditions change after issuance of a disengage command to the lock-up mechanism, with a previously determined judgment value;

a slip condition learning means for learning a slip condition of the torque converter at a predetermined operating condition with the lock-up mechanism disengaged; and a diagnosis condition correction means for correcting the judgment value as a diagnosis condition of the fault diagnosis step in accordance with the learned result of the slip condition.

24. An apparatus for diagnosing a fault in a lock-up mechanism of a torque converter in an automatic transmission according to claim 23, wherein the slip condition learning is carrier out after lapse of a predetermined time from issuance of a disengage command to the lock-up mechanism.

* * * * *